(12) United States Patent
So et al.

(10) Patent No.: US 8,397,631 B2
(45) Date of Patent: *Mar. 19, 2013

(54) BOWL AND BASKET ASSEMBLY AND SALAD SPINNER INCORPORATING SUCH AN ASSEMBLY

(75) Inventors: Kwok Kuen So, Kowloon (HK); Abel Yiu Chung Wan, New Territories (HK)

(73) Assignee: Kwok Kuen So, Kowloon (HK)

( * ) Notice: Subject to any disclaimer, the term of this patent is extended or adjusted under 35 U.S.C. 154(b) by 766 days.

This patent is subject to a terminal disclaimer.

(21) Appl. No.: 12/273,880

(22) Filed: Nov. 19, 2008

(65) Prior Publication Data

US 2009/0211460 A1 Aug. 27, 2009

(30) Foreign Application Priority Data

Nov. 20, 2007 (EP) .................................. 07254510

(51) Int. Cl.
*B01D 33/00* (2006.01)

(52) U.S. Cl. ....................................................... 99/495

(58) Field of Classification Search .................... 99/495, 99/458, 461, 496, 503, 505; 206/216, 541, 206/549, 499
See application file for complete search history.

(56) References Cited

U.S. PATENT DOCUMENTS

| 1,848,929 A | * | 3/1932 | Berg | ................................ 220/9.2 |
| 3,369,691 A | * | 2/1968 | Tohchung Wei | ............. 220/4.27 |

FOREIGN PATENT DOCUMENTS

| FR | 2280348 A | | 2/1976 |
| FR | 2290873 A | | 6/1976 |
| GB | 2228559 A | * | 8/1990 |

* cited by examiner

*Primary Examiner* — Gene Kim
*Assistant Examiner* — Amir Klayman
(74) *Attorney, Agent, or Firm* — William J. Sapone

(57) ABSTRACT

A bowl and basket assembly kit is disclosed as including an upper basket part (202), a middle basket part (204) and a lower basket part (206) linked with one another and engageable with one another in a way to form a perforated basket (200), an upper bowl part (102), a middle bowl part (104) and a lower bowl part (106) releasably engageable with one another to form a bowl (100) for receiving the perforated basket (200), and an upper locking ring (110) and a lower locking ring (112) which are swivellable about a longitudinal axis (L-L) of the bowl (100), wherein when the upper bowl part (102), middle bowl part (104) and lower bowl part (106) are engaged with one another, each of the locking rings (110, 112) is swivellable between a respective first position in which relative movement between the bowl parts (102, 104, 106) is allowed and a respective second position in which relative movement between the bowl parts (102, 104, 106) is prevented. A salad spinner (10) formed of such an assembly kit is also disclosed.

16 Claims, 21 Drawing Sheets

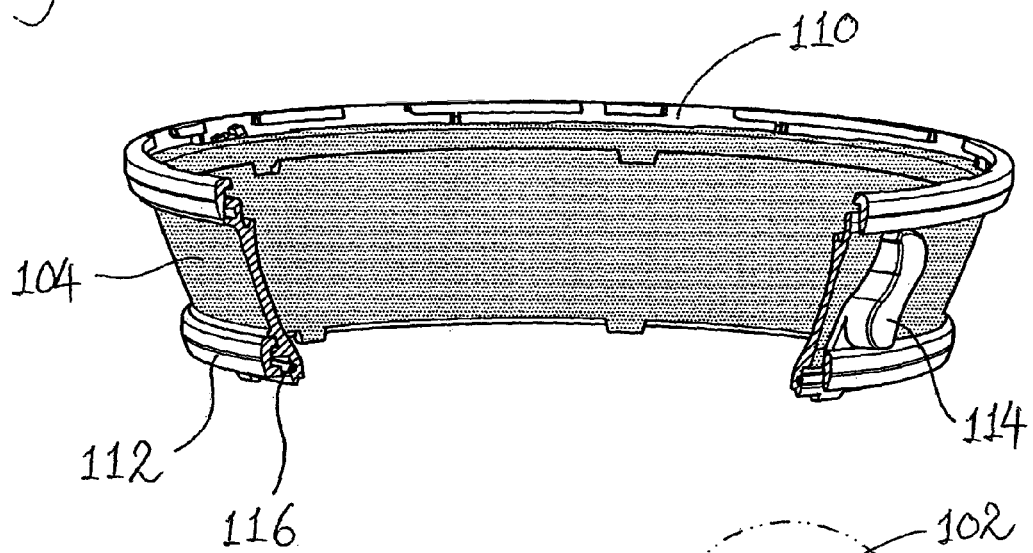
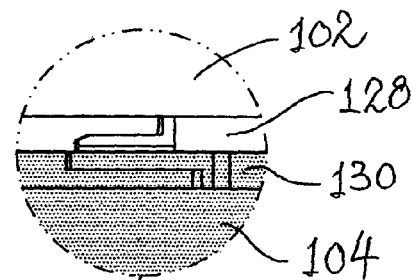
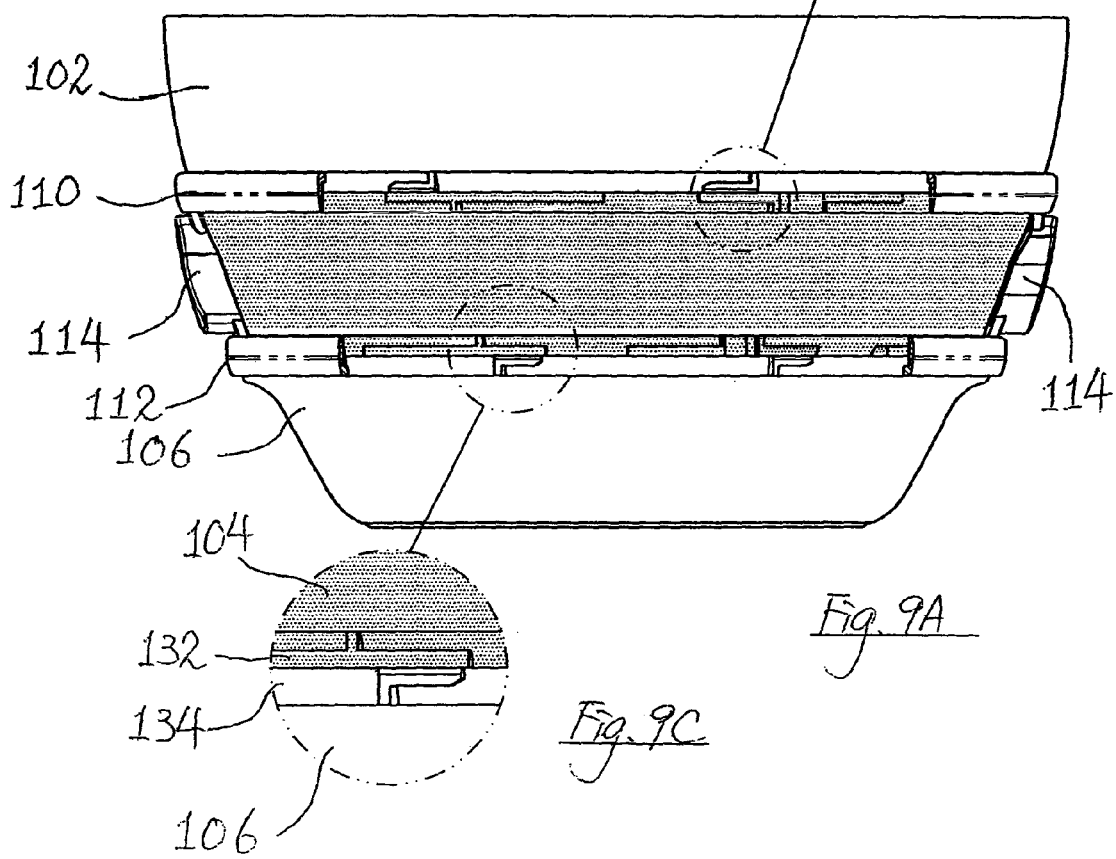

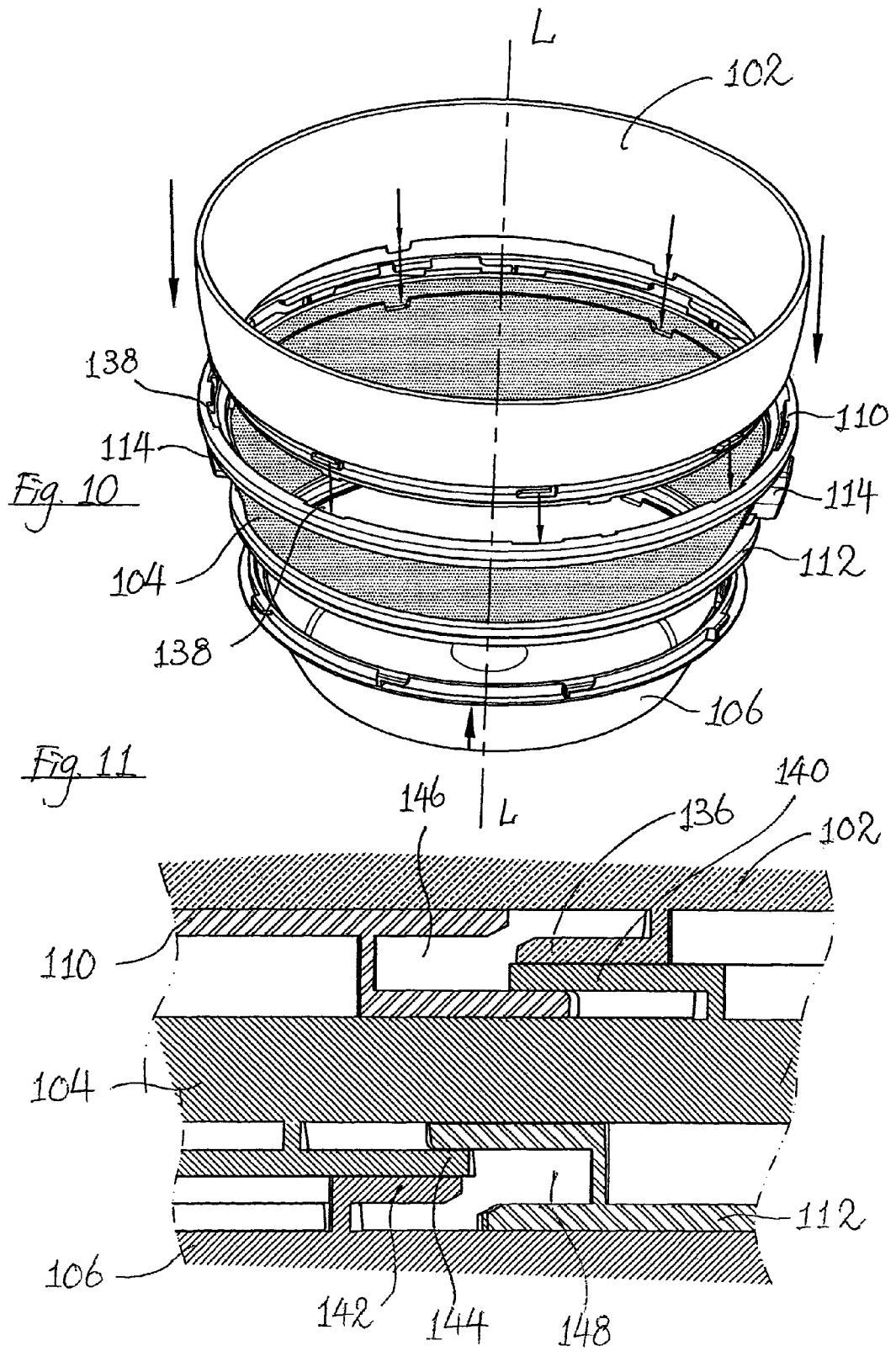

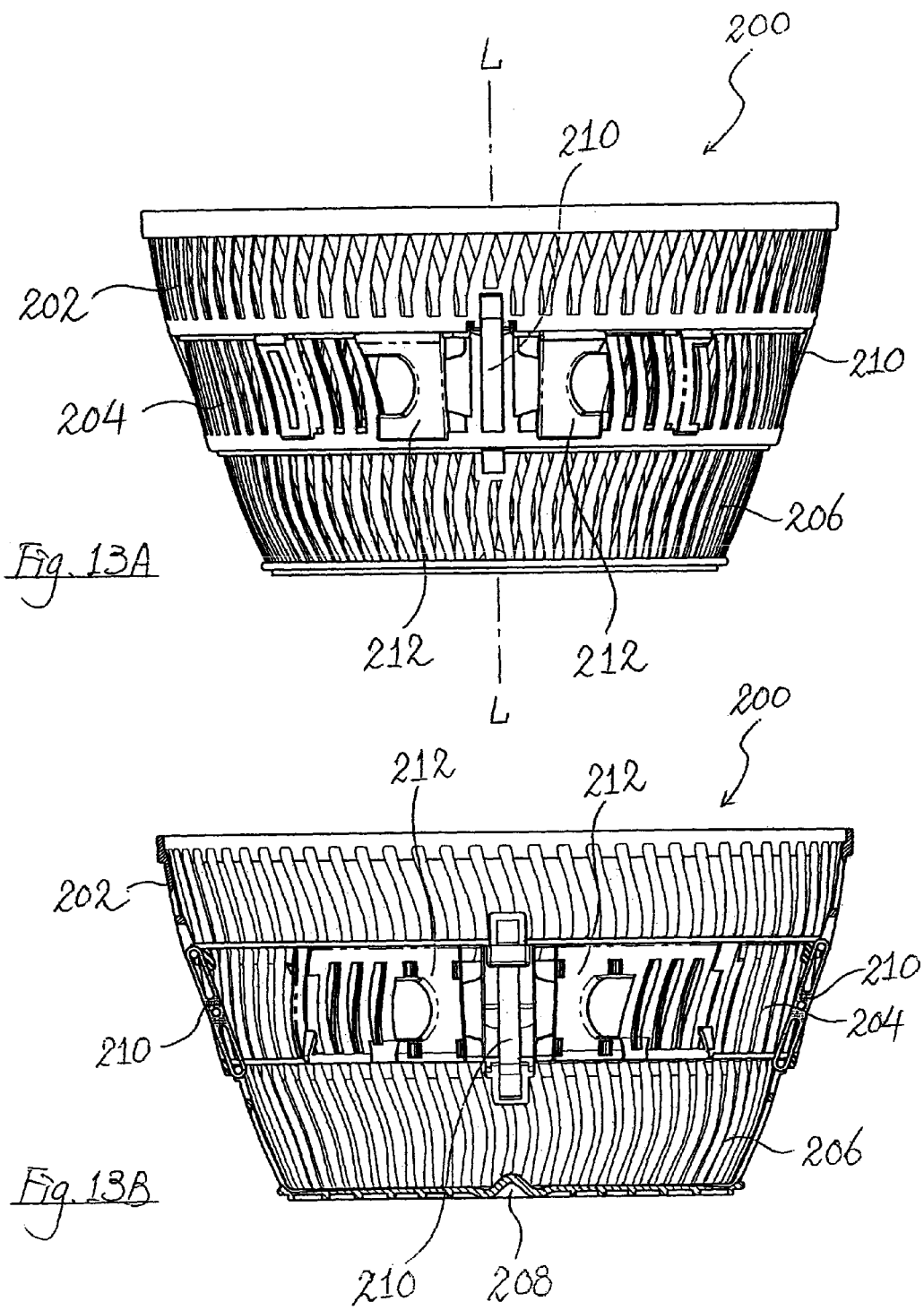

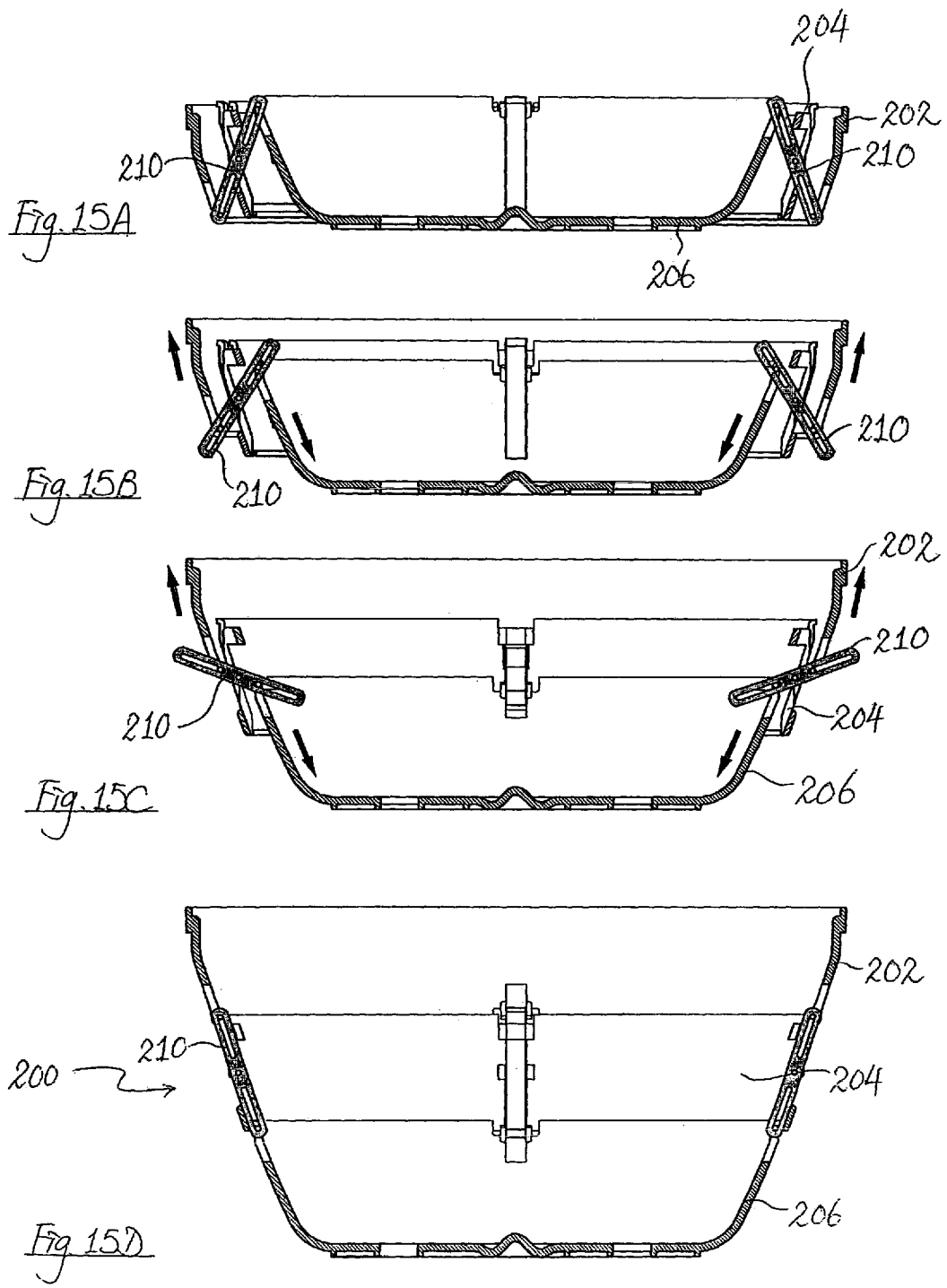

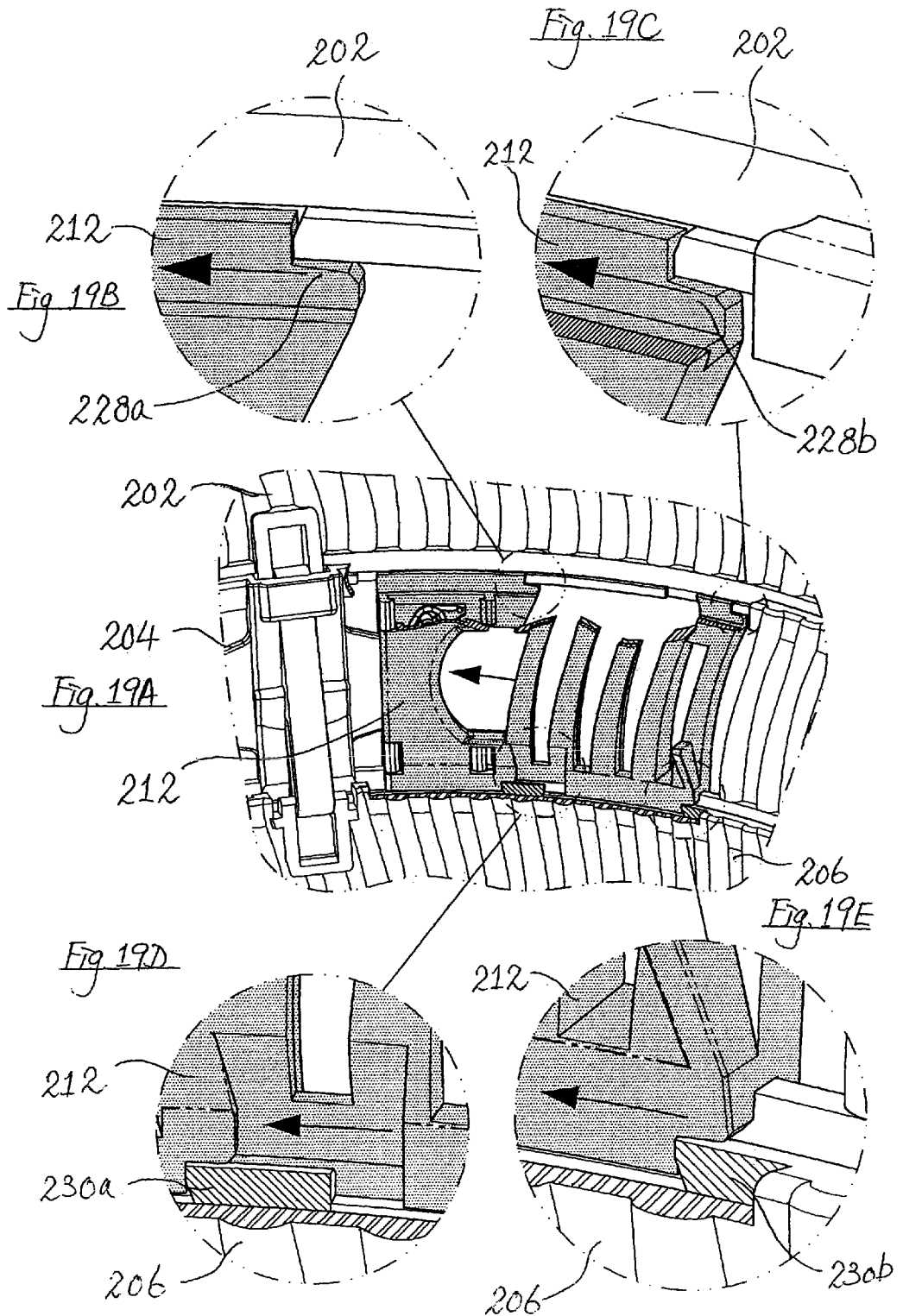

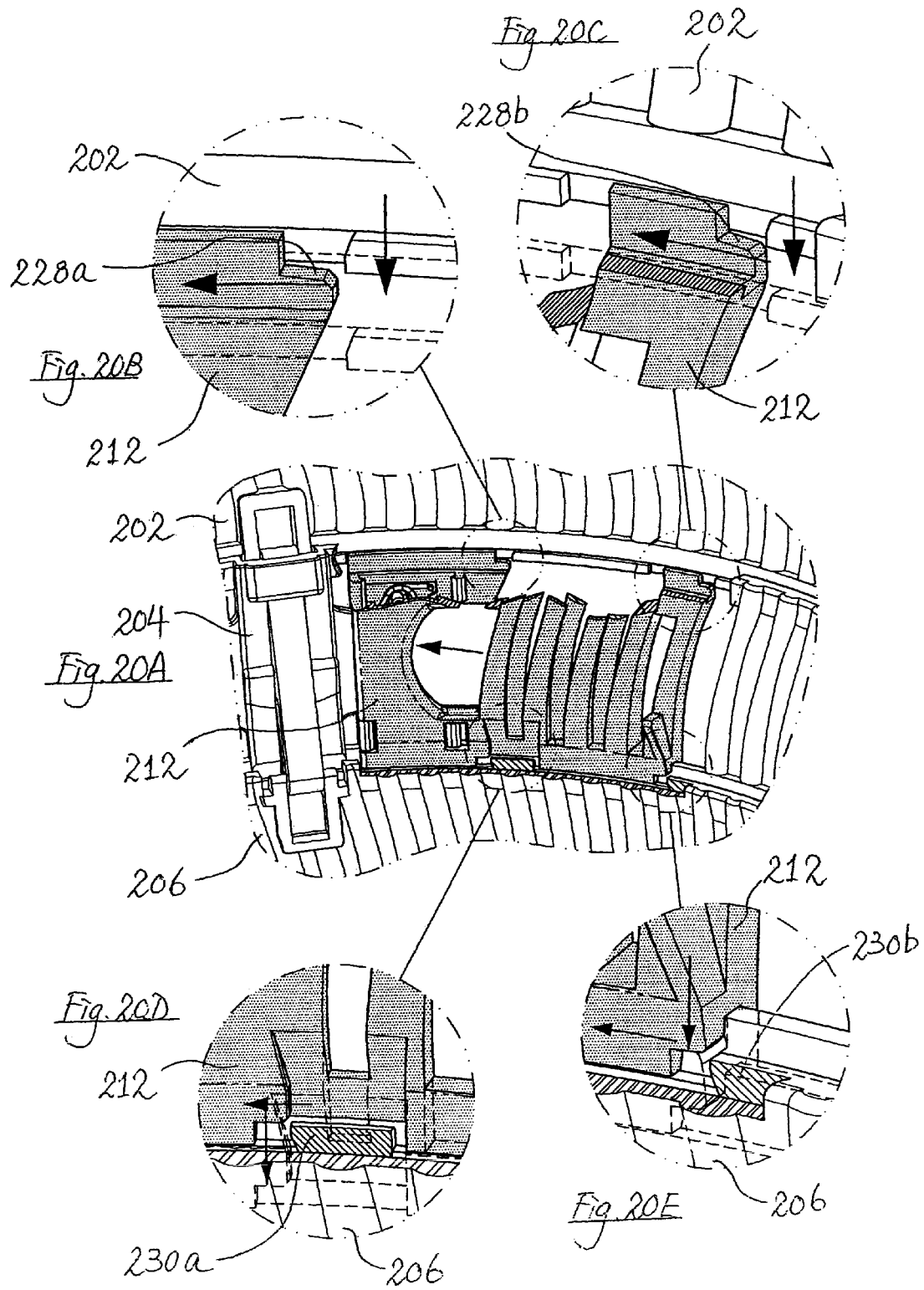

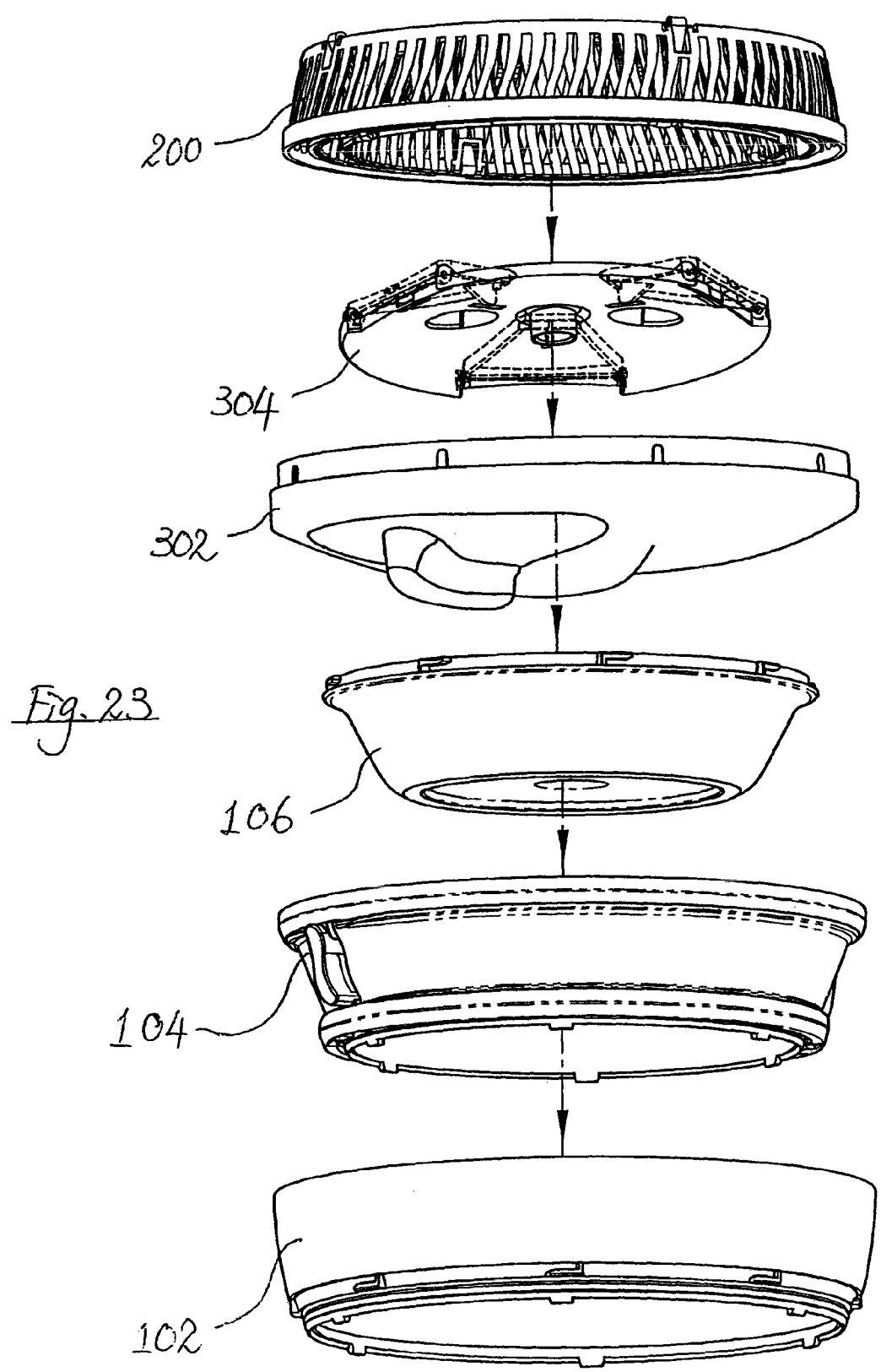

BOWL AND BASKET ASSEMBLY AND SALAD SPINNER INCORPORATING SUCH AN ASSEMBLY

This invention relates to a bowl and basket assembly, which is suitable for holding foodstuffs, and a salad spinner incorporating such an assembly.

Salad spinners for drying foodstuffs, e.g. vegetables, have been in existence for a long time. Such conventional salad spinners usually include an inner perforated basket received within an outer bowl, such that the basket can rotate relative to the bowl basically about a common longitudinal axis of the basket and bowl. By way of such an arrangement, upon rotational movement of the basket relative to the bowl, water held by the foodstuffs contained in the basket will be expelled and collected in the bowl, e.g. for subsequent disposal. In some other conventional salad spinners, driving mechanisms are provided which are engageable with the basket, and operable to cause the basket to rotate relative to the bowl.

A perennial problem associated with such conventional salad spinners is that they occupy a relatively large space, whether assembled or dissembled. Such makes the storage and transport of conventional salad spinners inefficient.

It is thus an object of the present invention to provide a bowl and basket assembly kit, a bowl and basket assembly, and a salad spinner with such a bowl and basket assembly in which the aforesaid shortcoming is mitigated, or at least to provide a useful alternative to the public.

According to a first aspect of the present invention, there is provided a bowl and basket assembly kit including at least a first body member and a second body member engageable with each other to form a perforated basket; at least a third body member and a fourth body member releasably engageable with each other to form a bowl for receiving at least part of said perforated basket; characterized in including lock means which is swivellable about a longitudinal axis of said bowl, wherein when said third body member and said fourth body member are engaged with each other, said lock means is swivellable between a first position in which relative movement between said third body member and said fourth body member is allowed and a second position in which relative movement between said third body member and said fourth body member is prevent.

According to a second aspect of the present invention, there is provided a bowl and basket assembly including at least a first body member and a second body member engaged with each other to form a perforated basket; at least a third body member and a fourth body member releasably engaged with each other to form a bowl for receiving at least part of said perforated basket; characterized in including lock means which is swivellable about a longitudinal axis of said bowl, wherein said lock means is swivellable between a first position in which relative movement between said third body member and said fourth body member is allowed and a second position in which relative movement between said third body member and said fourth body member is prevented.

According to a third aspect of the present invention, there is provided a salad spinner including a bowl and basket assembly, said assembly including at least a first body member and a second body member engaged with each other to form a perforated basket; at least a third body member and a fourth body member releasably engaged with each other to form a bowl for receiving at least part of said perforated basket; characterized in including lock means which is swivellable about a longitudinal axis of said bowl, wherein said lock means is swivellable between a first position in which relative movement between said third body member from and fourth body member is allowed and a second position in which relative movement between said third body member and said fourth body member is prevented.

An embodiment of the present invention will now be described, by way of an example only, with reference to the accompanying drawings in which:

FIG. 8 is a sectioned perspective view of the locking mechanism engaged with a middle bowl part;

FIG. 9A is a partly cut-off front view of the bowl shown in FIG. 2;

FIG. 9B is an enlarged view of one of the encircled parts in FIG. 9A, showing engagement between the upper bowl part and middle bowl part;

FIG. 9C is an enlarged view of another encircled part in FIG. 9A, showing engagement between the middle bowl part and the lower bowl part;

FIG. 10 shows the upper bowl part, middle bowl part and lower bowl part disengaged with one another;

FIG. 11 is a sectional view shows the upper bowl part, middle bowl part, lower bowl part and the two lock rings in an unlocked configuration;

FIG. 13A is a front view of the basket of the salad spinner shown in FIG. 1;

FIG. 13B is a sectional view of the basket shown in FIG. 13A;

FIGS. 15A to 15D show movement of the basket parts of the basket shown in FIG. 14B from the fully collapsed configuration to an assembled configuration;

FIG. 19A shows the locking arm in FIG. 18 in a locking position;

FIGS. 19B to 19E show enlarged views of a number of encircled parts in FIG. 19A;

FIG. 20A shows the locking arm in FIG. 18 in an unlocked position;

FIGS. 20B to 20E show enlarged views of a number of encircled parts in FIG. 20A;

FIG. 23 is an exploded perspective view of the parts of the salad spinner of FIG. 1 in a stored order;

DETAILED DESCRIPTION OF THE INVENTION

Figure 1:
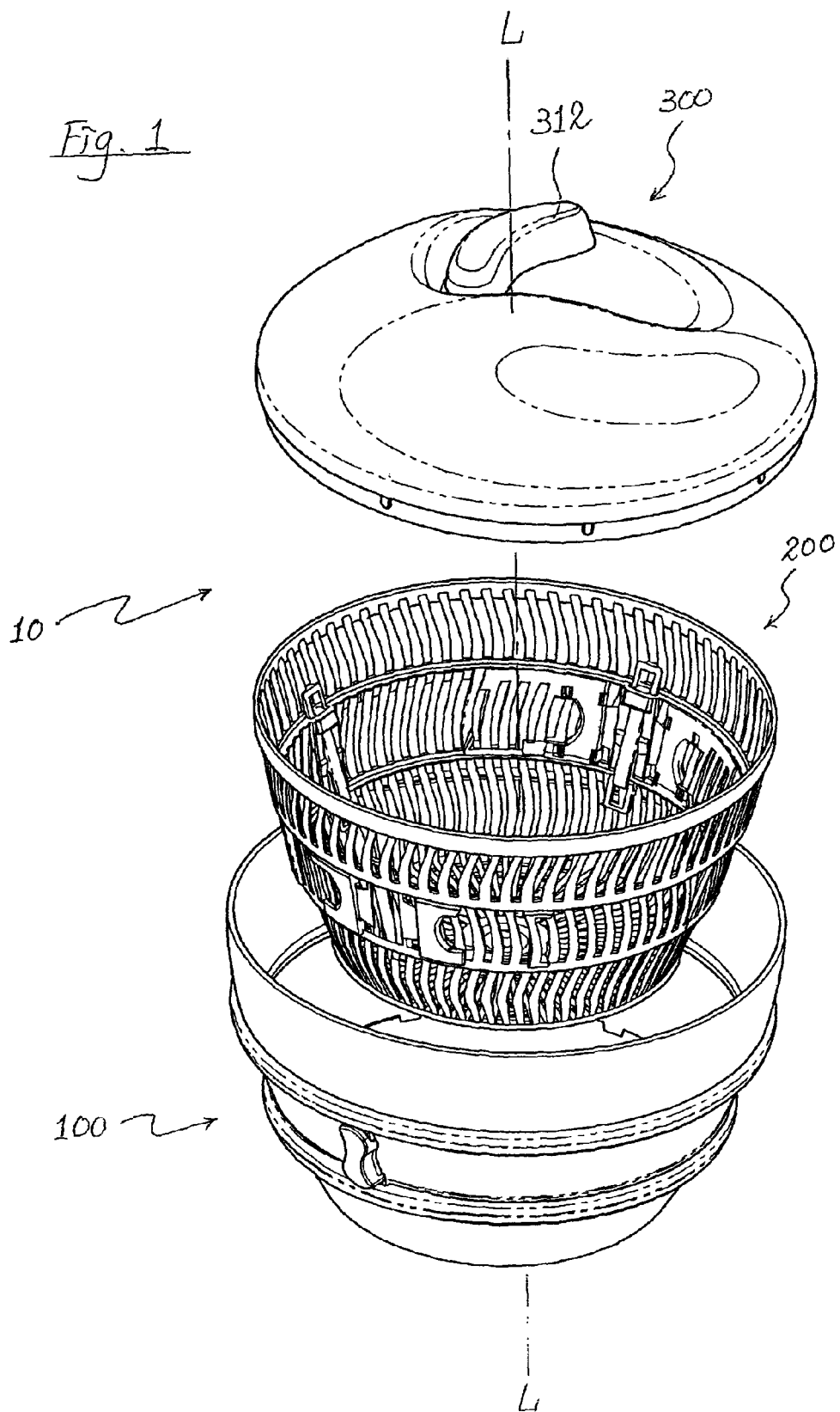
FIG. 1 is an exploded perspective view of a salad spinner according to an embodiment of the present invention.

FIG. 1 shows an exploded perspective of a salad spinner according to an embodiment of the present invention, generally designated as 10. The salad spinner 10 includes an outer bowl 100, a perforated inner basket 200, and a cover and driving mechanism assembly 300, which are releasably engageable with one another.

Figure 2:
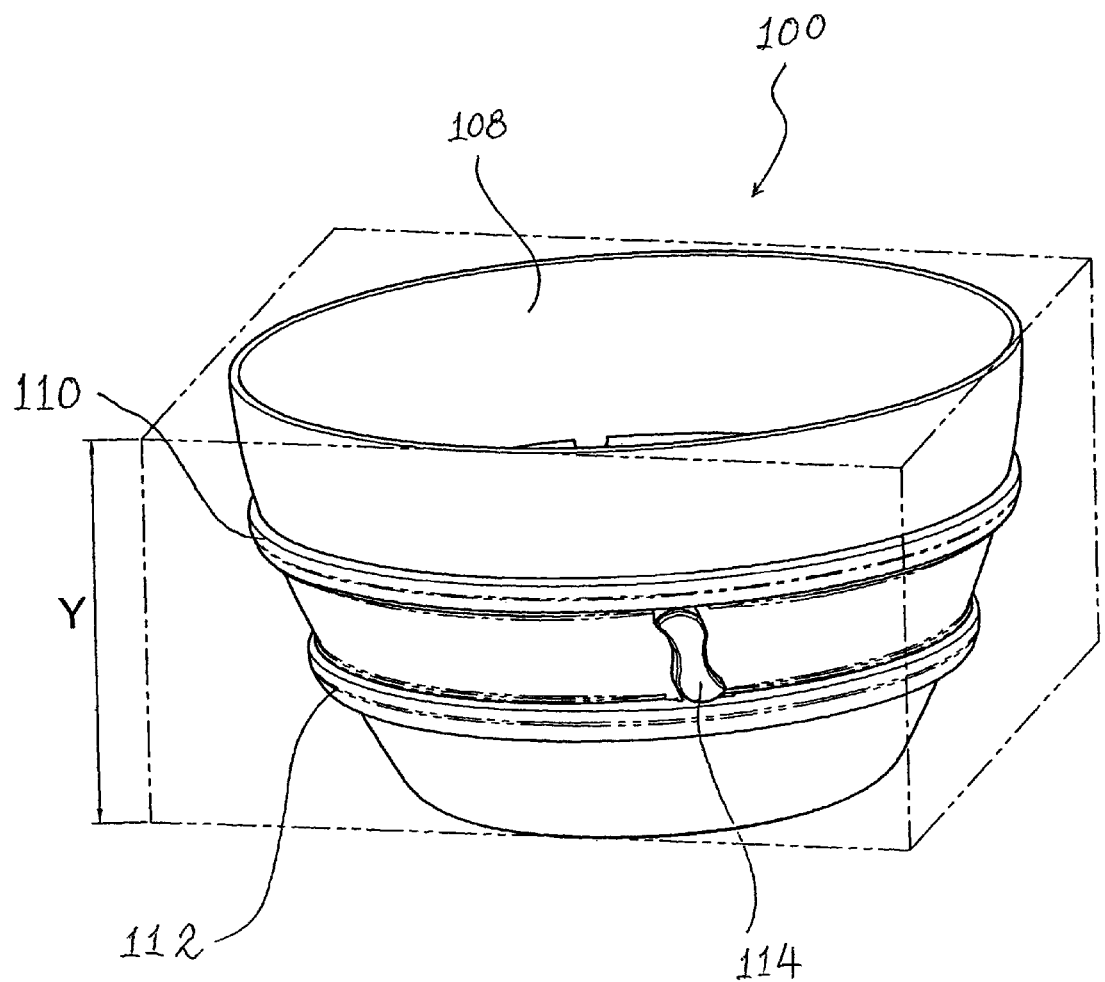
FIG. 2 is a perspective view of a bowl of the salad spinner shown in FIG. 1.
Figure 3A:
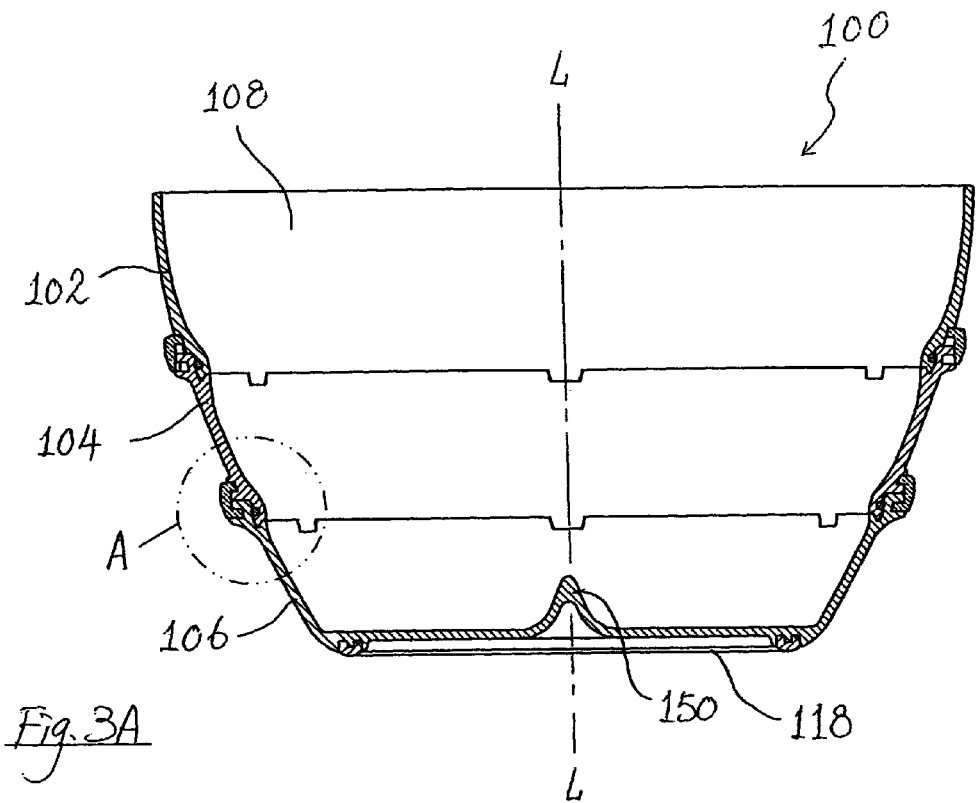
FIG. 3A is a sectional view of the bowl shown in FIG. 2.
Figure 3B:
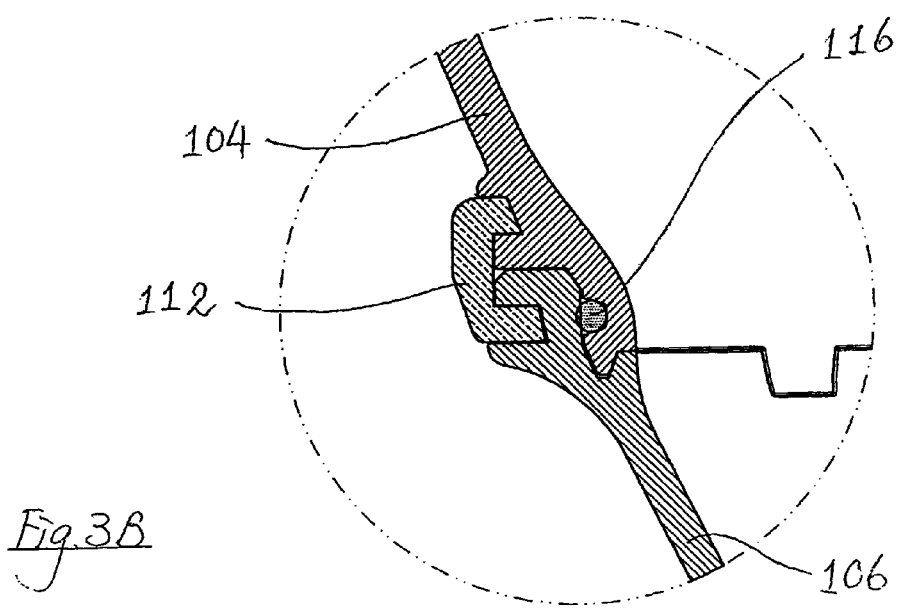
FIG. 3B is an enlarged view of the encircled part marked "A" in FIG. 3A.

Referring firstly to the bowl 100, and as shown in FIGS. 2 and 3A, such includes an upper bowl part 102, a middle bowl part 104 and a lower bowl part 106 inter-engaged with one another. When the bowl 100 is in the assembled configuration as shown in FIGS. 2 and 3A, it is of a height of Y, and has an interior space 108 for receiving the basket 200.

The bowl 200 is also installed with an upper locking ring 110 and a lower locking ring 112, and two control knobs 114 (of which only one is shown in FIG. 2), the function and structure of which will be further discussed below.

An O-ring 116, which may be made of silicone rubber, is positioned between the middle bowl part 104 and the lower bowl part 106, and a similar O-ring is positioned between the upper bowl part 102 and the middle bowl part 104, for sealing purposes. The lower bowl part 106 is engaged with a bottom ring 118, which assists in supporting and stabilizing the bowl 100 on a surface, e.g. table top.

Figure 4:
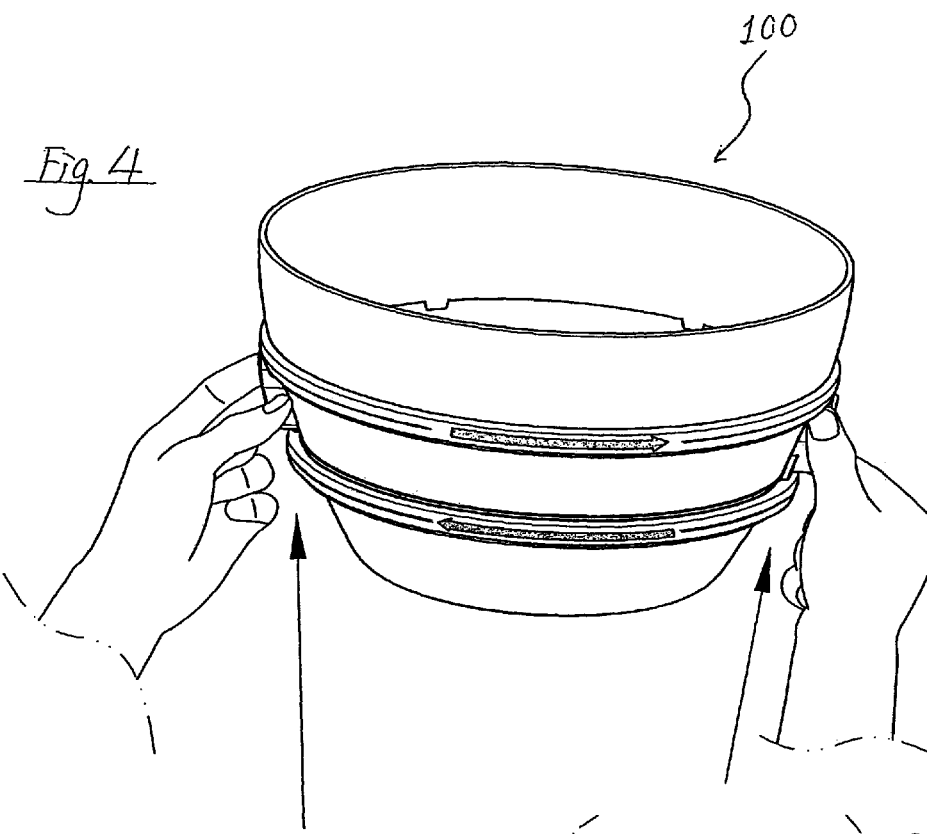
FIG. 4 shows manipulation of two lock handles of the bowl for locking and unlocking of the bowl parts.
Figures 5A, 5B:
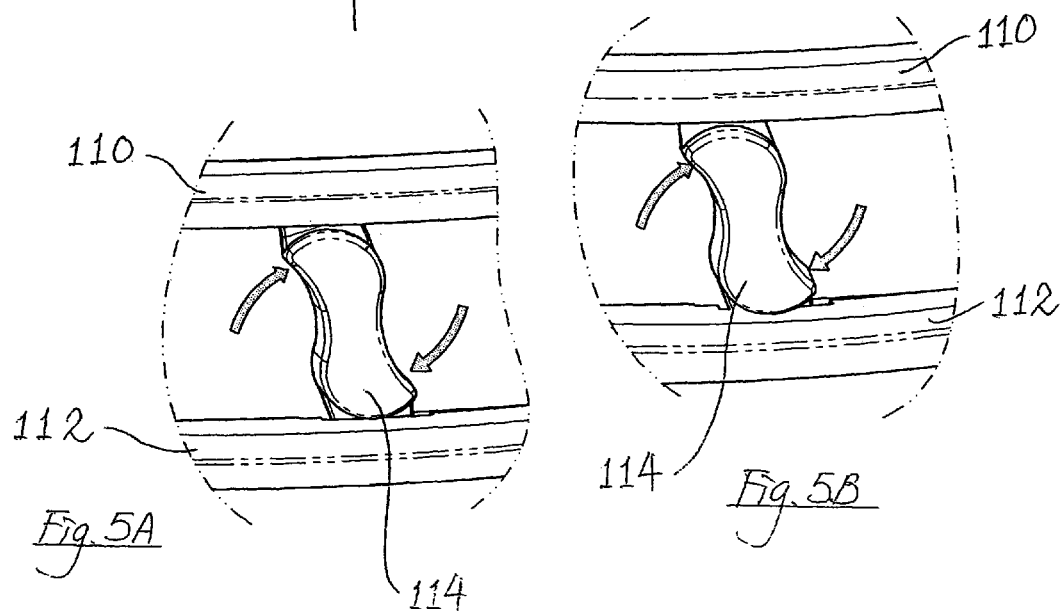
FIG. 5A shows one of the lock handles.
FIG. 5B shows the other lock handle.

As shown in FIGS. 4 to 5B, the two control knobs 114 may be swiveled relative to the bowl 100 by hands of a user to move the locking rings 110, 112, in a manner to be discussed below.

Figure 6:
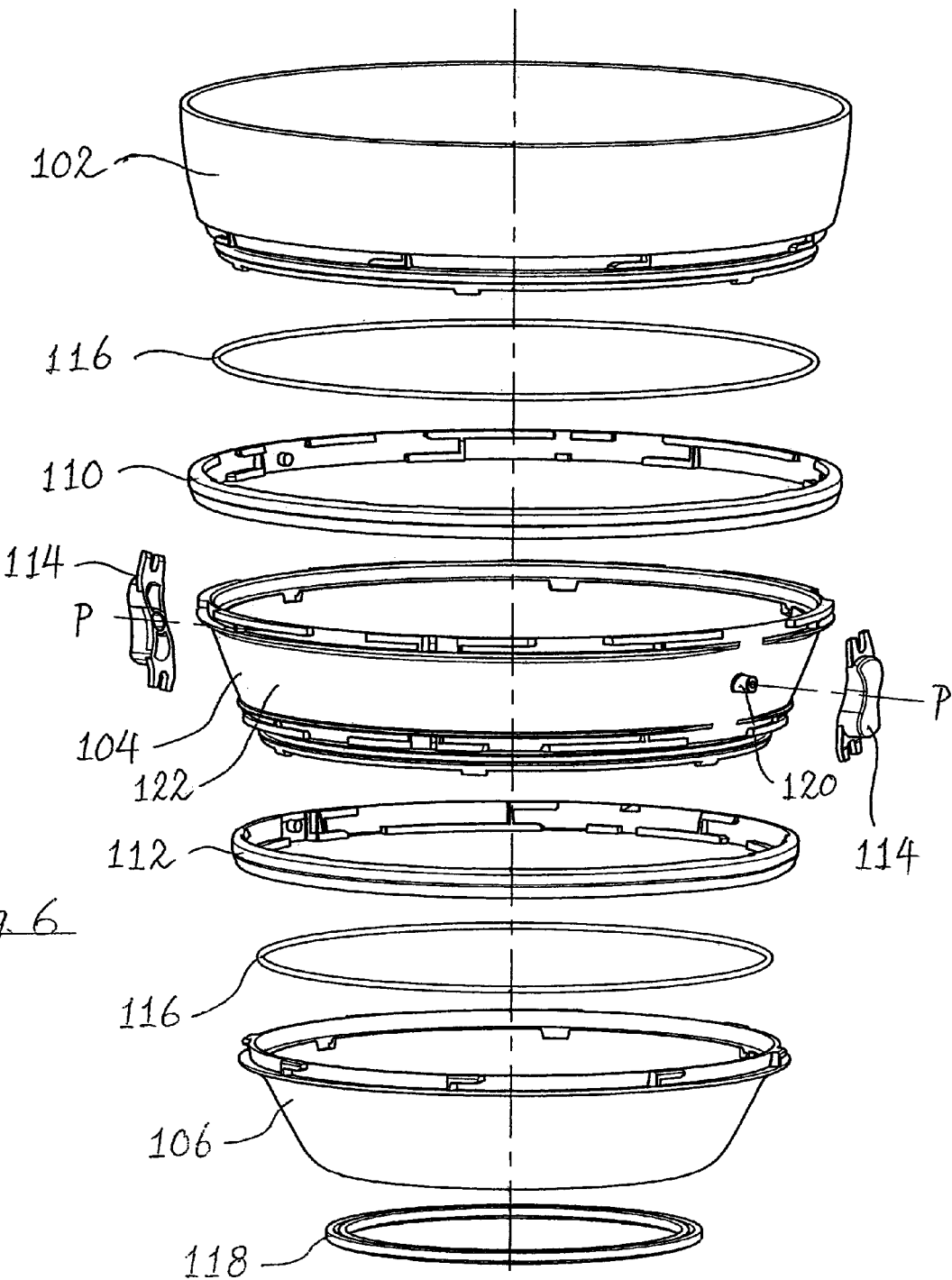
FIG. 6 is an exploded view of the parts forming the bowl and basket of the salad spinner shown in FIG. 1.

FIG. 6 shows an exploded view of the parts forming the bowl 100, including the upper bowl part 102, O-ring 116, upper locking ring 110, middle bowl part 104, control knobs 114, lower locking ring 112, O-ring 116, lower bowl part 106 and bottom ring 118. Two pins 120 (of which only one is shown in FIG. 6) extend diametrically from an annular wall 122 of the middle bowl part 104 for engagement with the control knobs 114, so as to allow the knobs 114 to rotate relative to the middle bowl part 104, and thus the bowl 100 when assembled, about an axis P-P which is perpendicular to the central longitudinal axis L-L of the bowl 100.

Figure 7A:
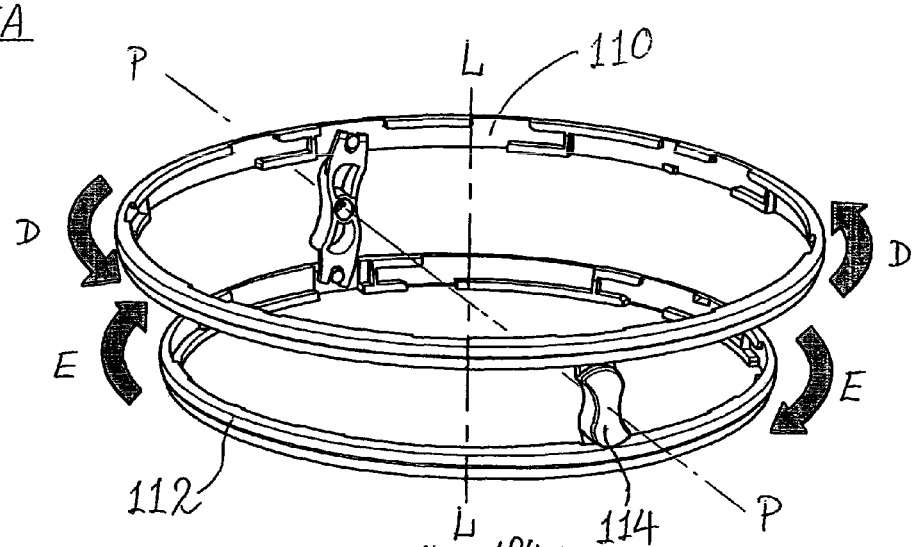
FIG. 7A is a perspective view of the locking mechanism of the salad spinner shown in FIG. 1.
Figure 7B:
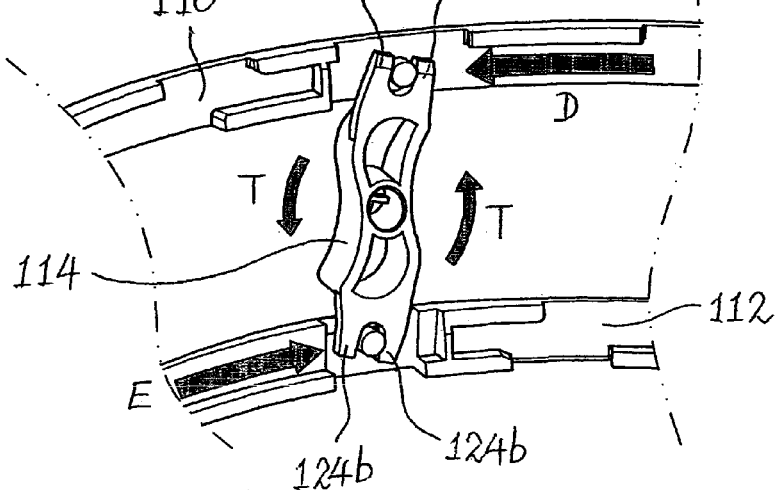
FIG. 7B is an enlarged view of part of the locking mechanism shown in FIG. 7A.
Figure 7C:
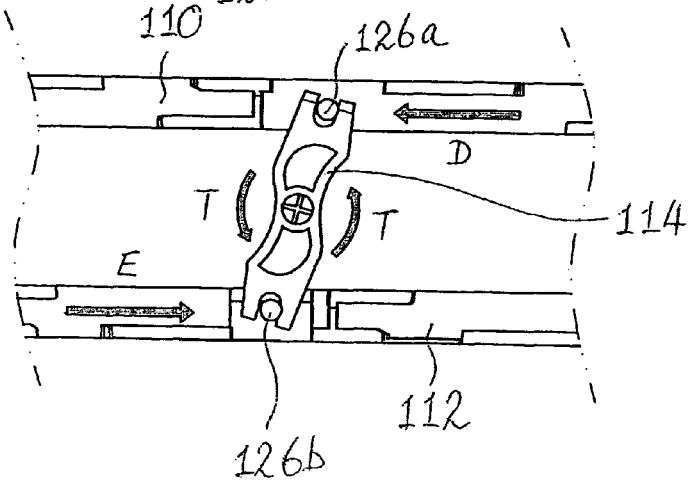
FIG. 7C is a front view of the enlarged part shown in FIG. 7B.

As shown in FIGS. 7A to 7C, the control knob 114 has a pair of upper prongs 124a and a pair of lower prongs 124b. The pair of upper prongs 124a are engaged with an upper spindle 126a of and fixed to the upper locking ring 110, such that the control knob 114 is pivotable about the central longitudinal axis of the upper spindle 126a. Similarly, the pair of lower prongs 124b are engaged with a lower spindle 126b of and fixed to the lower locking ring 112, such that the control knob 114 is pivotable about the central longitudinal axis of the lower spindle 126b.

It can be seen that, by way of such an arrangement, if the axis P-P is stationary, upon rotation of the control knob 114 about the axis P-P in the direction indicated by the arrows T in FIGS. 7B and 7C, the two locking rings 110, 112 will simultaneously rotate about the central longitudinal axis L-L, yet each in a different direction. In particular, the upper locking ring 110 will rotate in the direction indicated by the arrow D (which is in the anti-clockwise direction when viewed from above), and the lower locking ring 112 will rotate in the direction indicated by the arrow E (which is in the clockwise direction when viewed from above). Clearly, if the control knob 114 is rotated in a direction opposite to that indicated by the arrow T, the upper locking ring 110 and the lower locking ring 112 will rotate in a respective opposite direction.

FIG. 8 shows the engagement between the upper locking ring 110, the middle bowl part 104, the lower locking ring 112, one of the control knobs 114 and one of the O-rings 116. By way of such an arrangement, rotation of the knob 114 will cause the upper locking ring 110 (which abuts and sits on an upper annular rim of the middle bowl part 104) to rotate relative to the middle bowl part 104, and will cause the lower locking ring 112 (which abuts and sits below a lower annular rim of the middle bowl part 104) to rotate relative to the middle bowl part 104, in a direction opposite to the direction of rotation of the upper locking ring 110.

FIGS. 9A to 9C show the way in which the upper bowl part 102, the middle part 104, the lower bowl part 106, the upper locking ring 110, the lower locking ring 112 and the control knobs 114 are engaged with one another to form the bowl 100. It can be seen that a lower annular rim 128 of the upper bowl part 102 abuts and sits on an upper annular rim 130 of the middle bowl part 104, and a lower annular rim 132 of the middle bowl part 104 abuts and sits on an upper annular rim 134 of the lower bowl part 106.

As shown in FIGS. 10 and 11, when the upper locking ring 110 is in an unlocking position, bent fingers 136 of the upper bowl part 102 may be received through recesses 138 of the upper locking ring 110 to abut and extend generally co-terminus with upper bent fingers 140 of the middle bowl part 104. Similarly, when the lower locking ring 112 is in an unlocking position, bent fingers 142 of the lower bowl part 106 may be received through recesses (not shown) of the lower locking ring 112 to abut and extend generally co-terminus with lower bent fingers 144 of the middle bowl part 104.

FIG. 11 shows that the bent fingers 136, 140 extend towards one direction and the bent fingers 142, 144 extend towards another direction. FIG. 11 also shows that that the upper locking ring 120 has an upper recess 146 of a height sufficient to receive both the bent fingers 136, 140, and a lower recess 148 of a height sufficient to receive both the bent fingers 142, 144. It can be seen that the upper recess 146 and lower recess 148 are open sideward, each in a different direction.

Figure 12A:
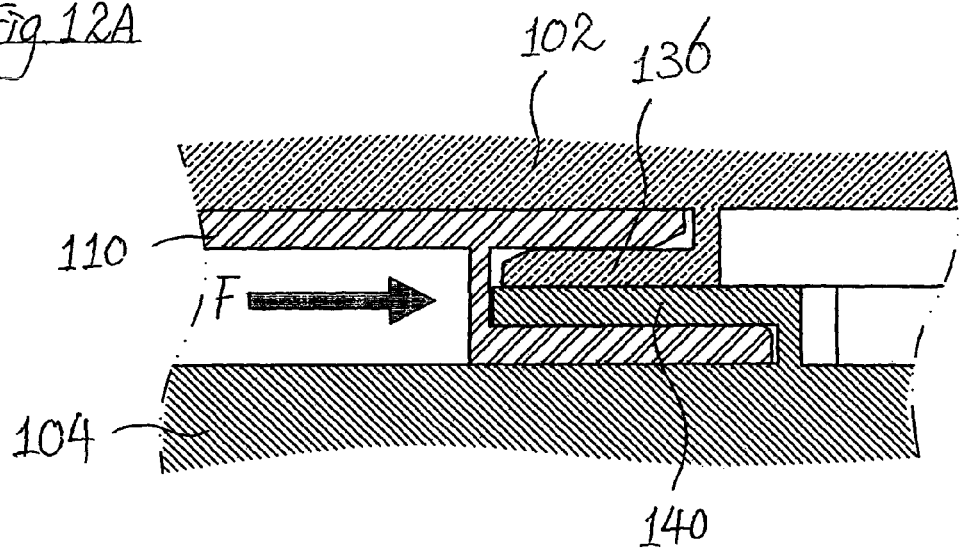
FIG. 12A shows movement of the upper lock ring to a locking position to lock the upper bowl part and the middle bowl part against relative movement.

As shown in FIG. 12A, when the upper locking ring 110 rotates about the longitudinal axis L-L in the direction indicated by the arrow F to the locking position as shown in FIG.

12A, both the bent fingers 136, 140 are received within the recess 146 of the upper locking ring 110, such that the upper bowl part 102 and the middle bowl part 104 cannot be moved relative to each other, i.e. they are locked with each other. When the upper locking ring 110 is then rotated in the opposite direction back to the unlocking position, the upper bowl part 102 and the middle bowl part 104 are unlocked and may be disengaged from each other.

Figure 12B:
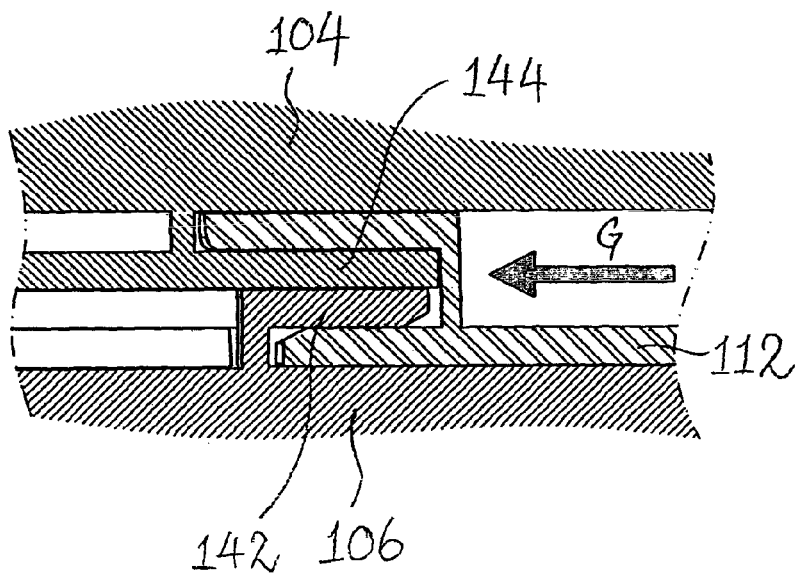
FIG. 12B shows movement of the lower locking ring to a locking position to lock the middle bowl part and the lower bowl part against relative movement.

Similarly, and as shown in FIG. 12B, when the lower locking ring 112 rotates about the longitudinal axis L-L in the direction indicated by the arrow G, which is opposite to the direction indicated by the arrow F shown in FIG. 12A, to the locking position as shown in FIG. 12B, both the bent fingers 142, 144 are received within the recess 148 of the lower locking ring 112, such that the middle bowl part 104 and the lower bowl part 106 cannot be moved relative to each other, i.e. they are locked with each other. When the upper locking ring 112 is then rotated in the opposite direction back to the unlocking position, the middle bowl part 104 and the lower bowl part 106 are unlocked and may be disengaged from each other.

Although the bowl 100 has so far been disclosed as comprising three bowl parts 102, 104, 106, it is envisaged that it may instead comprise two bowl parts, e.g. only the middle bowl part 104 and the lower bowl part 106, in which only one locking ring in engagement with both bowl parts is required. This single locking ring may be rotated upon operation of one control knob 114 or a pair of control knobs 114. On the other hand, if, for example, a bowl of a larger size is required, the bowl 100 may comprise four or more bowl parts, in which case more than two locking rings will be required.

FIGS. 13A and 13B show, respectively, a front view and a sectional view of the perforated basket 200. The basket 200 has an upper basket part 202, a middle basket part 204 and a lower basket part 206. The lower basket part 206 has a recess 208 to sit on and be supported by an upwardly extending protrusion 150 of the lower bowl part 106 of the bowl 100 (see FIG. 3A). By way of such an arrangement, when the basket 200 is received within the bowl 100, the basket 200 may be caused to rotate relative to the bowl 100 generally about the longitudinal axis L-L of the bowl 100.

Figure 14A:
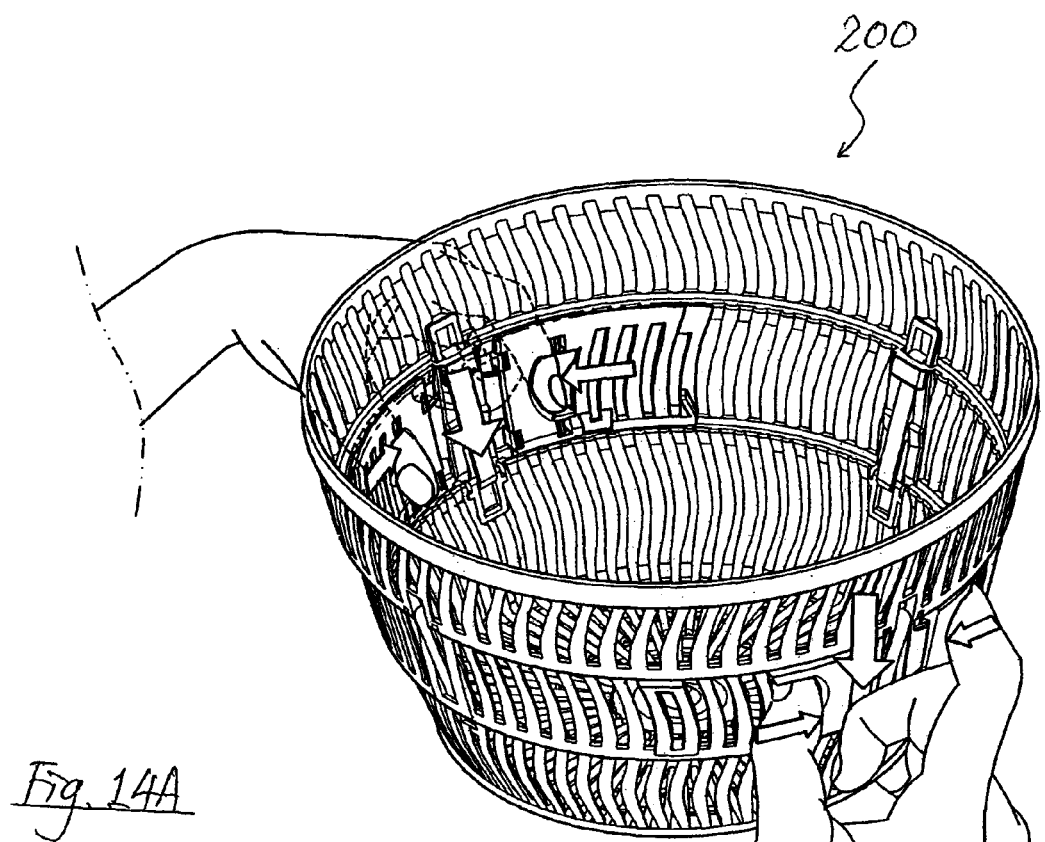
FIG. 14A shows manual manipulation of two locking arms of the basket shown in FIG. 13A.
Figure 14B:
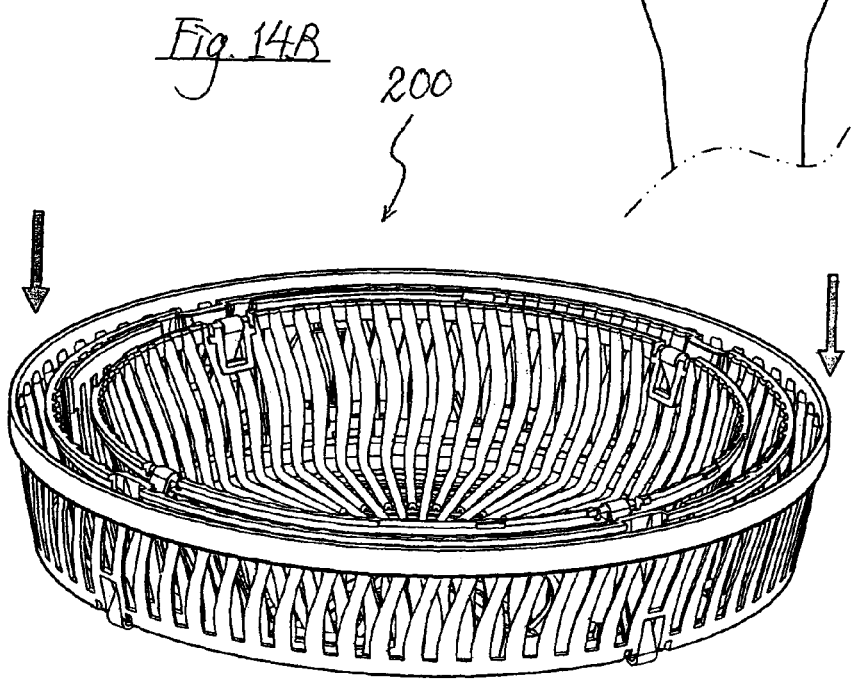
FIG. 14B is a perspective view of the basket shown in FIG. 13A in a collapsed configuration.

The upper basket part 202, middle basket part 204 and lower basket part 206 are always linked with one another by four links 210, although they may be moved relative to one another. As shown in FIG. 14A, upon manual operation of two pairs of locking arms 212, the basket 200 may be moved from the fully expanded configuration as shown in FIG. 13A to 14A to the fully collapsed configuration as shown in FIG. 14B.

As shown in FIGS. 15A to 15D, the links 210 are pivotally engaged with the three basket parts 202, 204, 206. The basket parts 202, 204, 206 may be moved from the fully collapsed configuration as shown in FIG. 15A (in which the lower basket part 206 is within, on the same level with, and generally concentric with the middle basket part 204, which is in turn within, on the same level with, and generally concentric with, the upper basket part 202) through the partly expanded configuration as shown in FIG. 15B, to the further partly expanded configuration as shown in FIG. 15C, until the fully expanded configuration as shown in FIG. 15D, in which the upper basket part 202 sits on the middle basket part 204, which in turn sits on the lower basket part 206.

It can be seen that the links 210 pivot about the middle basket part 204, and pivot about and slide relative to the upper basket part 202 and the lower basket part 206 during this movement. When at the fully expanded configuration, the links 210 are in frictional engagement with the upper basket part 202 and the lower basket part 206 in order to assist the basket 200 to remain in this fully expanded configuration.

Figure 16A:
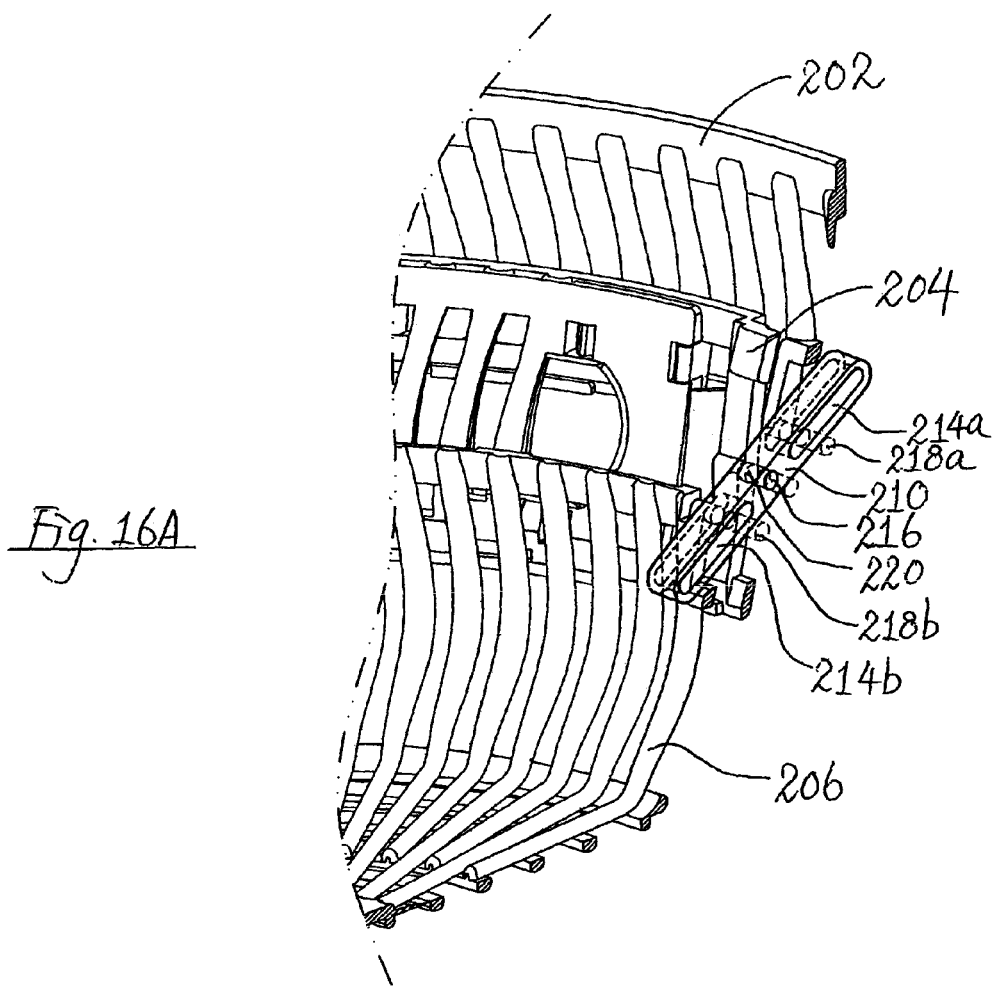
FIG. 16A is an enlarged perspective view showing linking of the upper basket part, middle basket part and lower basket part of the basket shown in FIG. 13A.
Figure 16B:
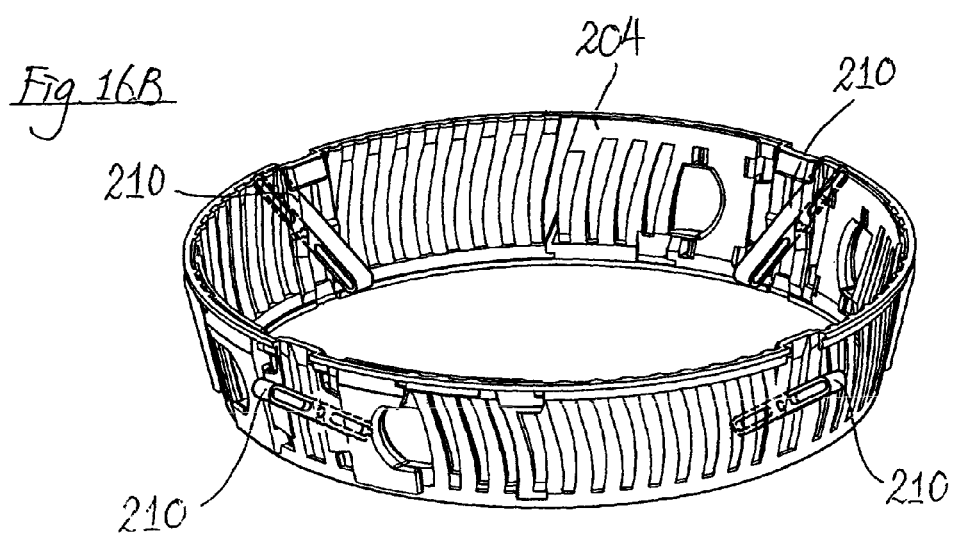
FIG. 16B is a perspective view of the middle basket part of the basket shown in FIG. 13A.

As can be seen more clearly in FIGS. 16A and 16B, each of the links 210 has two parallel slots 214a, 214b and a through-hole 216. The slot 214a receives a pin 218a carried by the upper basket part 202 for relative sliding and rotational movement; the slot 214b receives a pin 218b carried by the lower basket part 206 for relative sliding and rotational movement; and the through-hole 216 receives a pin 220 fixed with and carried by the middle basket part 204 for relative rotational movement. By way of such an arrangement, the basket parts 202, 204, 206 may be manipulated to move between the fully collapsed configuration and the fully expanded configuration.

Figure 17:
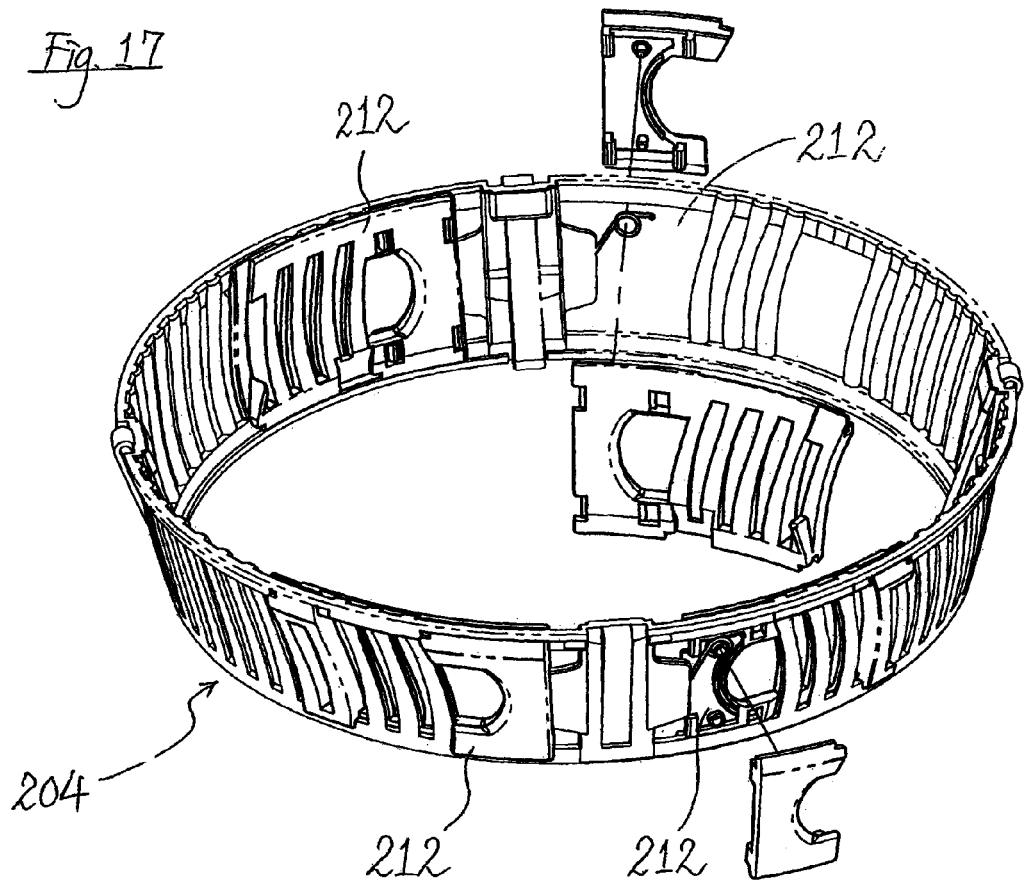
FIG. 17 is a partly exploded view of the middle basket part shown in FIG. 16B.
Figure 18:
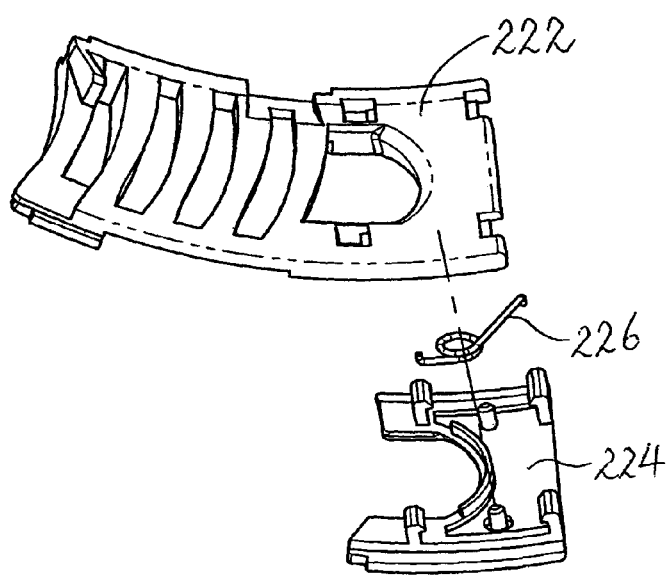
FIG. 18 is an exploded view of the locking arm carried by the middle basket part shown in FIG. 17.

FIG. 17 shows that the middle basket part 204 has two pairs of locking arms 212 which are operable by four fingers of a user, as shown in FIG. 14A. In particular, each pair of locking arms 212 are movable by the user from their normal stable locking positions towards each other to the unlocked position, to allow the basket parts 202, 204, 206 to move from the fully expanded configuration to the fully collapsed configuration. Each locking arm 212 has a main body 222 and a cover 224 which may be fixed with each other to contain a torsion spring 226. When the locking arms 212 are installed on the middle basket part 204, they can slide along the wall surface of the middle basket part 204.

FIG. 19A to 19E show the locking arm 212 in its normal stable locking position. When the basket 200 is in the fully expanded configuration, and as shown in FIGS. 19B and 19C, when the locking arm 212 is in the locking position, parts of the upper basket part 202 abut and sit on stepped portions 228a, 228b of the locking arm 212, so that the upper basket part 202 cannot move relative to the middle basket part 204. Similarly, as shown in FIGS. 19D and 19E, parts of the locking arm 212 abut and sit on stepped portions 230a, 230b of the lower basket part 206, so that the middle basket part 204 cannot move relative to the lower basket part 206. The upper basket part 202, middle basket part 204 and lower basket part 206 are thus locked with one another against relative movement.

As shown in FIG. 20A, the locking arm 212 may be caused to slide along the wall surface of the middle basket part 204, and against the biasing force of the torsion spring 226, to the unlocked position shown in FIG. 20A. In this position, and as shown in FIGS. 20B and 20C, the upper basket part 202 is out of abutment with the stepped portions 228a, 228b of the locking arm 212, so that the upper basket part 202 may move downward relative to the middle basket part 204. Similarly, and as shown in FIGS. 20D and 20E, the locking arm 212 is out of abutment with the stepped portions 230a, 230b of the lower basket part 206, so that the locking arm 212, and thus the middle basket part 204, may move downward relative to the lower basket part 206. The basket parts 202, 204, 206 may thus move from the fully expanded configuration as shown in FIG. 13A to the fully collapsed configuration as shown in FIG. 14B. When the force applied by the user on the locking arm 212 is removed, the locking arm 212 will return, under the biasing force of the spring 226, to the normal stable position.

Figure 21A:
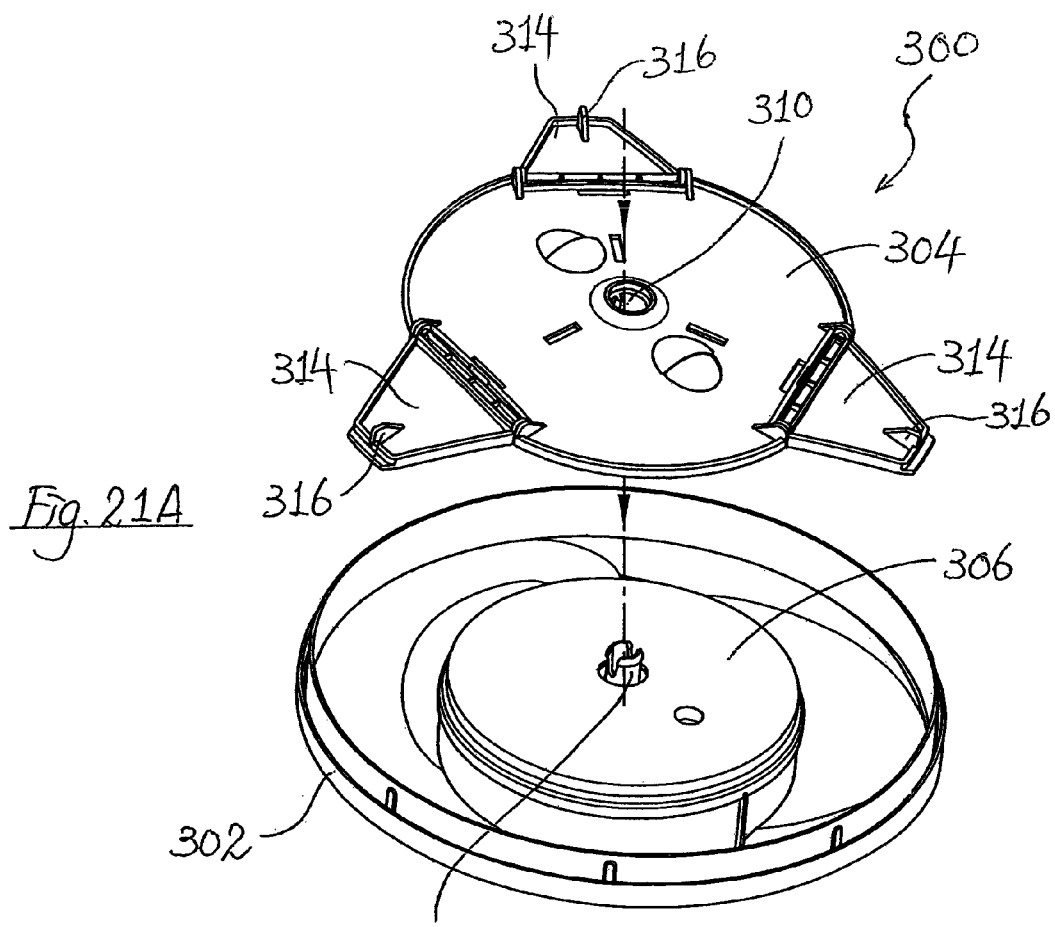
FIG. 21A is an exploded bottom perspective view of a cover and driving mechanism assembly of the salad spinner shown in FIG. 1.

FIG. 21A shows an exploded bottom perspective view of the cover and driving mechanism assembly 300 shown in FIG. 1. As shown in FIG. 21A, the assembly 300 includes a cover 302 for releasably engaging with and covering the bowl 100. The cover 302 has a housing 306 containing a transmission mechanism with an output spindle 308 for engagement with a hole 310 of a top 304. Upon rotational of the output spindle 308 about its longitudinal axis, the top 304 will be brought into simultaneous rotational movement about the same axis. Returning to FIG. 1, on an upper surface of the assembly 300 is a manually operable lever 312 which may be pivoted to and fro to cause the spindle output 308 to rotate about its longitudinal axis in one direction, thus causing the top 304 to exhibit rotational movement in like manner.

Figure 21B:
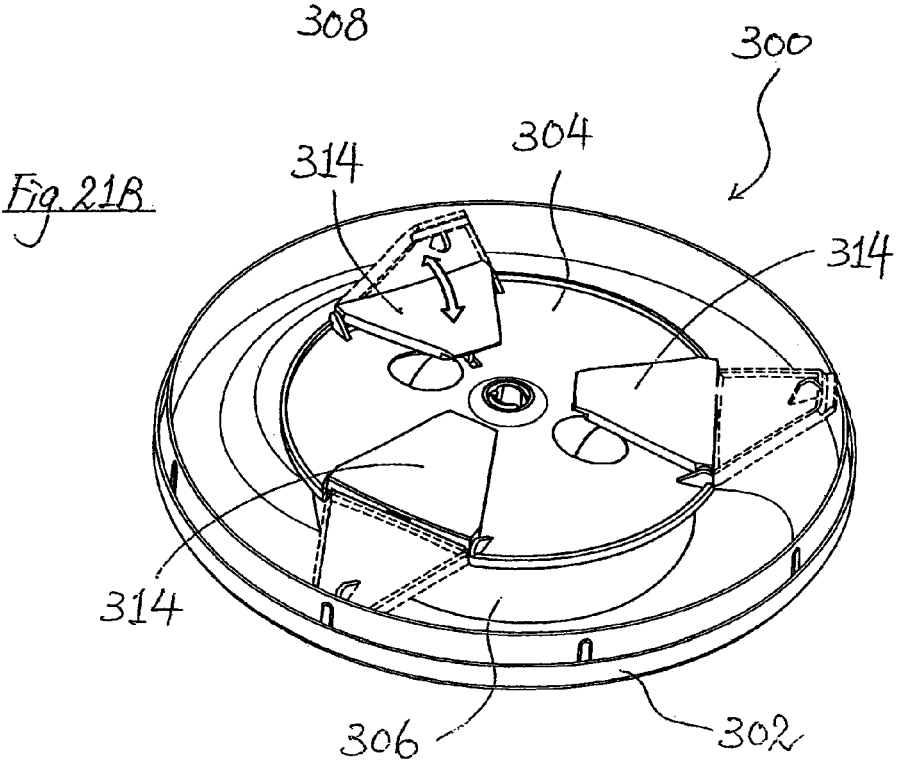
FIG. 21B is an assembled view of the cover and driving mechanism assembly shown in FIG. 21A.

The top 304 has three hingedly engaged wings 314 which may be pivoted about a respective axis (all being perpendicular to the longitudinal axis of the top 304) between the extended position as shown in FIG. 21A and the folded position as shown in FIG. 21B. When in the extended position, and when the basket 200 is received within the bowl 100 to form a bowl and basket assembly, the cover and driving mechanism assembly 300 may be placed on the bowl and basket assembly and operated to impart rotational movement to the basket 200 relative to the bowl 100 about the central longitudinal axis L-L. In particular, each wing 314 has a toe 316 which, when the assembly 300 is placed on the bowl and basket assembly, engages a respective perforation in the basket 200 for bringing the basket 200 into simultaneous rotational movement.

Figure 22:
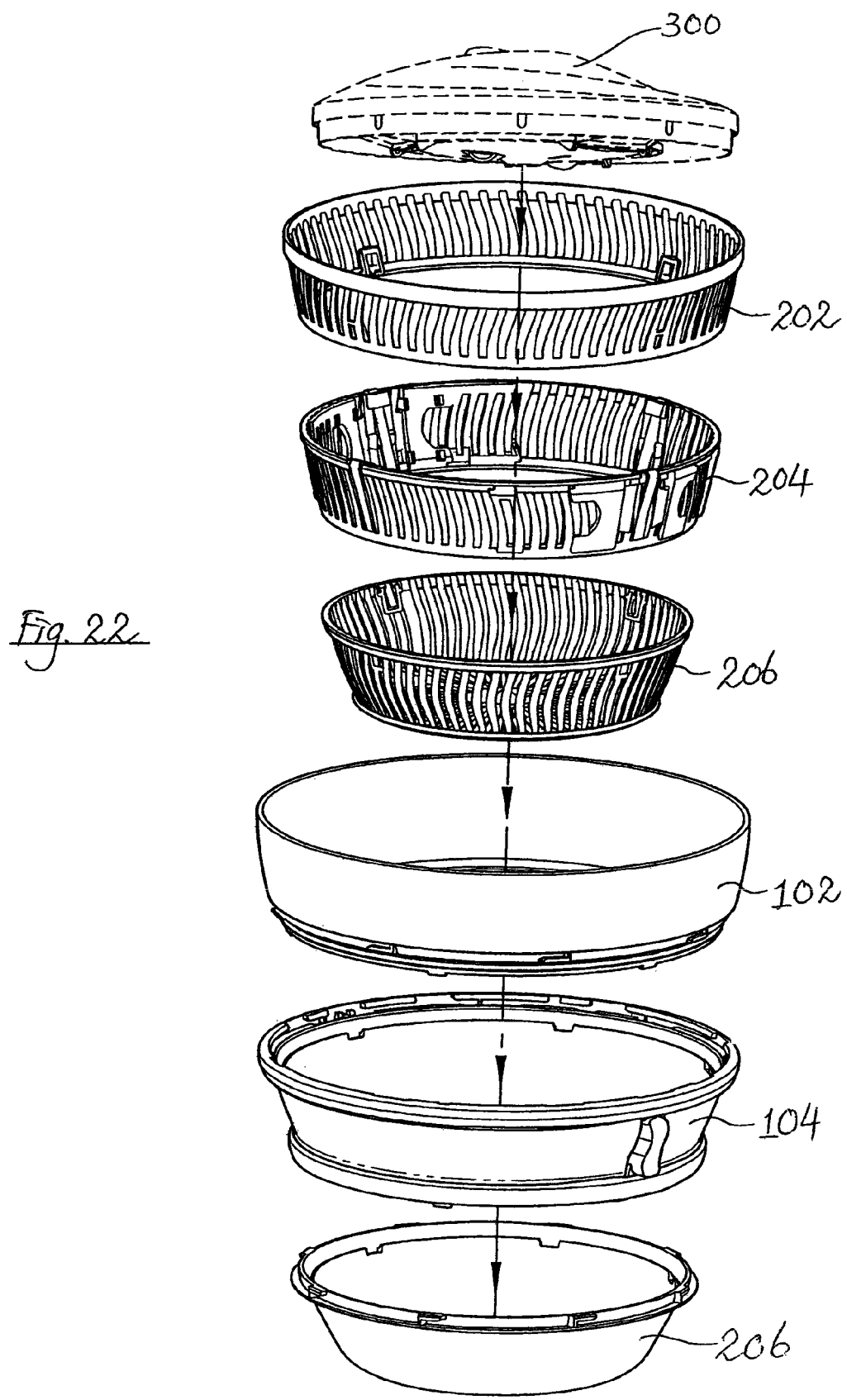
FIG. 22 is an exploded perspective view of the bowl parts, basket parts and cover and driving mechanism assembly of the salad spinner of FIG. 1 in an assembled order.

The components forming the salad spinner 10, including the cover and driving mechanism assembly 300, upper basket part 202, middle basket part 204, lower basket part 206, upper bowl part 102, middle bowl part 104, and lower bowl part 206 may form a kit, are shown in FIG. 22.

Figure 24A:
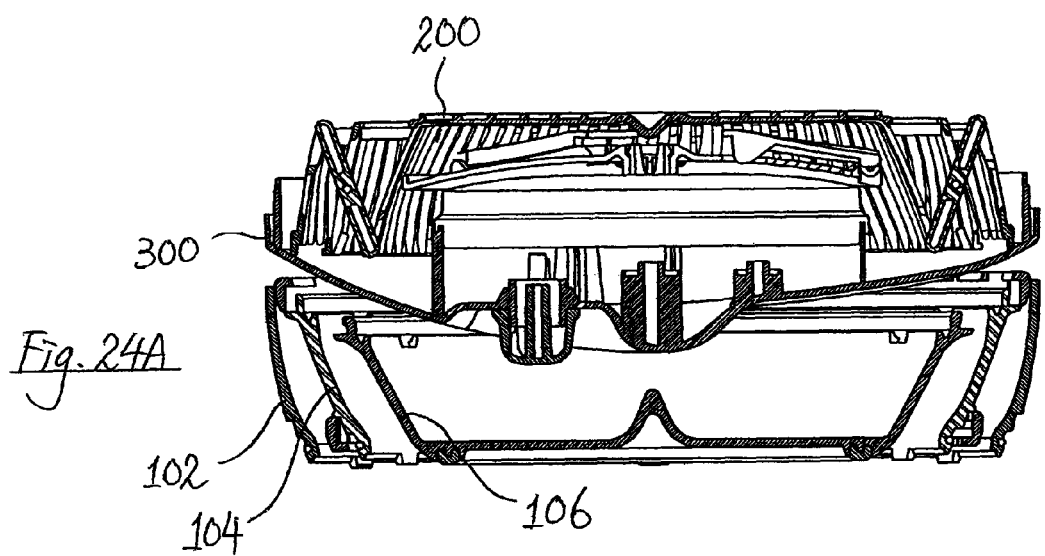
FIG. 24A is a sectional view of the salad spinner of FIG. 1 as stored.
Figure 24B:
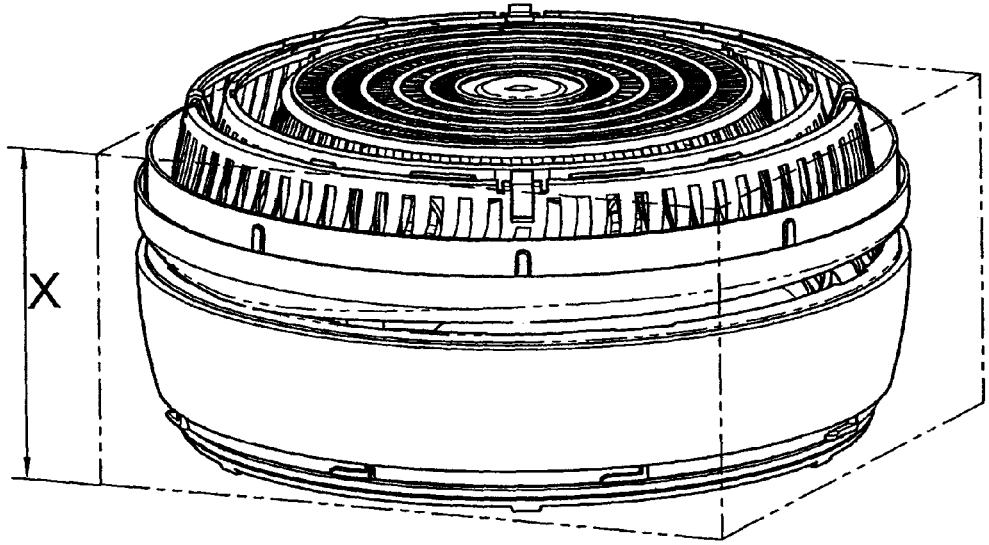
FIG. 24B is a perspective view of the stored salad spinner of FIG. 24.
Figure 26:
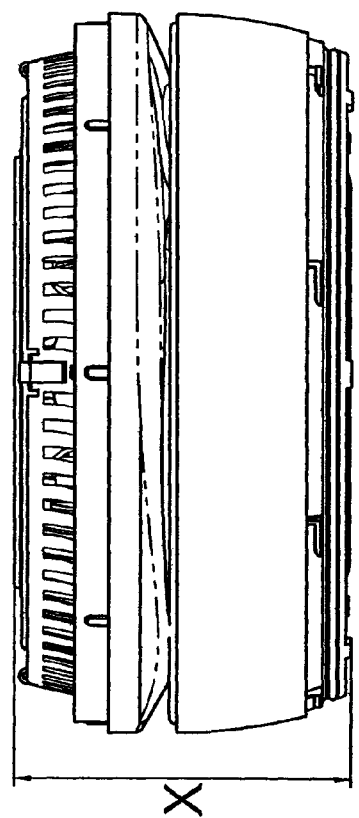
FIG. 26 is a front view of the salad spinner of FIG. 24B in a stored configuration.
Figure 25:
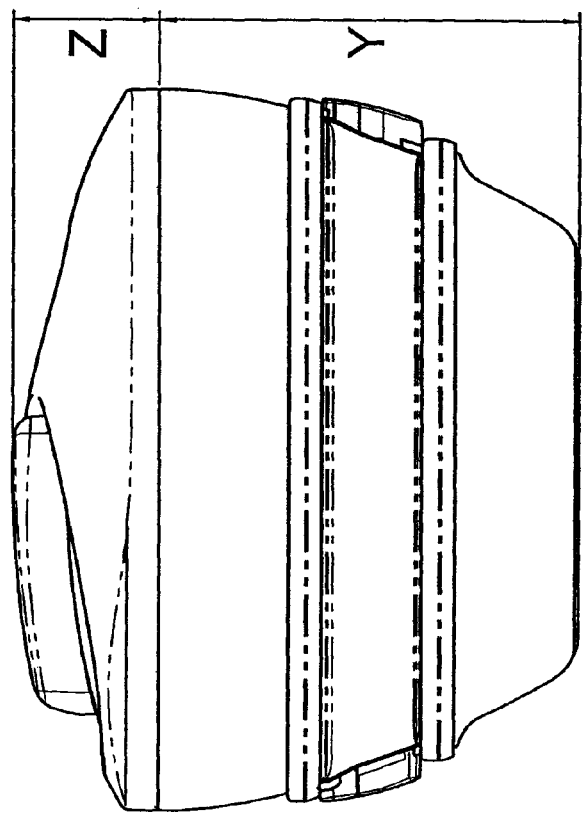
FIG. 25 is a front view of the salad spinner of FIG. 1 in an assembled configuration.

When packaged, the kit may be arranged in the order as shown in FIGS. 23 and 24A, in which the upper bowl part 102 contains within it the middle bowl part 104, which in turn contains within it the lower bowl part 106, on which is supported the cover and driving mechanism assembly 300 (including the cover 302 and the top 304, in an upside down manner, and with the wings 314 inwardly folded), and with the collapsed basket 200 at the uppermost position, again in an upside down manner.

As shown in FIGS. 24B to 26, the salad spinner 10, when fully assembled, is of a height of Y+Z, which is no less than that of a conventional salad spinner. However, the dissembled and packaged kit for the salad spinner kit is only of a height of X, which is significantly less than Y+Z. Thus, when compared with conventional salad spinners, much less space is required for storing the dissembled salad spinner 10 according to this invention, without any compromise on the amount of foodstuff which may be contained in the salad spinner 10.

It should be understood that the above only illustrates an example whereby the present invention may be carried out, and that various modifications and/or alterations may be made thereto without departing from the spirit of the invention. It should also be understood that various features of the invention which are, for brevity, here described in the context of a single embodiment, may be provided separately or in any appropriate sub-combinations.

The invention claimed is:

1. A bowl and basket assembly kit including:
    at least a first basket part (206) and a second basket part (204) engageable with each other to form a perforated basket (200);
    at least a first bowl part (106) and a second bowl part (104) releasably engageable with each other to form a bowl (100) for receiving at least a portion of said perforated basket;
    locking means (110, 112) which are swivellable about a longitudinal axis (L-L) of said bowl, mounted for swivellably moving between a locking position and an unlocking position;
    wherein when said first bowl part and said second bowl part are engaged with each other, said locking means are swivellable between the unlocking position in which relative movement between said first bowl part and said second bowl part is allowed and the locking position in which relative movement between said first bowl part and said second bowl part is prevented, and, further comprising pivotably mounted manually operable control means (114), said locking means being engaged by the pivotably movable manually operable control means for moving the locking means between the locking position and the unlocking position, wherein said control means are pivotable about an axis (P-P) which is generally perpendicular to the longitudinal axis of said bowl.

2. A bowl and basket assembly kit according to claim 1 wherein said control means are pivotable to bring about a swiveling movement of said locking means.

3. A bowl and basket assembly kit including:
    at least a first basket part (206) and a second basket part (204) engageable with each other to form a perforated basket (200);
    at least a first bowl part (106) and a second bowl part (104) releasably engageable with each other to form a bowl (100) for receiving at least a portion of said perforated basket;
    at least one pair of locking rings, a first locking ring (110) and a second locking ring (112), which are swivellable about a longitudinal axis (L-L) of said bowl, each locking ring mounted for swivelably moving between a locking position and an unlocking position;
    wherein when said first bowl part and said second bowl part are engaged with each other, said pair of locking rings are swivellable between the unlocking position in which relative movement between said first bowl part and said second bowl part is allowed and the locking position in which relative movement between said first bowl part and said second bowl part is prevented;
    wherein said pair of locking rings are operatively associated with a manually operable control means (114); and
    wherein said control means are pivotable about an axis (P-P) which is generally perpendicular to the longitudinal axis of said bowl.

4. A bowl and basket assembly kit according to claim 3 wherein said first locking ring is in contact with said first bowl part and said second bowl part and said second locking ring is in contact with said second bowl part and a third bowl part.

5. A bowl and basket assembly kit according to claim 3 wherein said control means are swivellable to cause said pair of locking rings to swivel.

6. A bowl and basket assembly kit according to claim 5 wherein said control means have a first end and a second end, wherein said first end of said control means are engaged with said first locking ring for relative pivotal movement, wherein said second end of said control means is engaged with said second locking ring for relative pivotal movement, and wherein said axis (P-P) about which said control means are swivellable is fixed relative to the first bowl part and is between said first end and second end of said control means, and wherein said control means are swivellable about said axis (P-P) to cause said pair of locking rings to swivel each in a different direction.

7. A bowl and basket assembly including:
    at least a first basket part (206) and a second basket part (204) engaged with each other to form a perforated basket (200);
    at least a first bowl part (106) and a second bowl part (104) releasably engaged with each other to form a bowl (100) for receiving at least a portion of said perforated basket; and, locking means (110, 112) which are swivellable about a longitudinal axis (L-L) of said bowl, mounted for swivellably moving between a locking position and an unlocking position;

wherein said locking means are swivellable between the unlocking position in which relative movement between said first bowl part and said second bowl part is allowed and the locking position in which relative movement between said first bowl part and said second bowl part is prevented;

pivotably mounted manually operable control means (114), said locking means being engaged by the pivotably movable manually operable control means for moving the locking means between the locking position and the unlocking position, wherein said control means are pivotable about an axis (P-P) which is generally perpendicular to the longitudinal axis of said bowl.

8. A salad spinner (10) including an outer bowl, a perforated inner basket, a cover and a driving mechanism, wherein the outer bowl and the perforated inner basket are provided as the bowl and basket assembly of claim 7.

9. A salad spinner according to claim 8 wherein the driving mechanism comprises means (300) operable to drive said basket (200) to rotate within and relative to said bowl (100) about said longitudinal axis (L-L).

10. A salad spinner according to claim 9 wherein said driving means are releasably engageable with said basket.

11. A bowl and basket assembly kit according to claim 7 wherein said locking means are in contact with said first bowl part and said second bowl part.

12. A bowl and basket assembly including:

at least a first basket part (206) and a second basket part (204) engaged with each other to form a perforated basket (200);

at least a first bowl part (106) and a second bowl part (104) releasably engaged with each other to form a bowl (100) for receiving at least a portion of said perforated basket;

at least one pair of locking rings, a first locking ring (110) and a second locking ring (112), which are swivellable about a longitudinal axis (L-L) of said bowl, each locking ring mounted for swivelably moving between a locking position and an unlocking position;

wherein said pair of locking rings are swivellable between the unlocking position in which relative movement between said first bowl part and said second bowl part is allowed and the locking position in which relative movement between said first bowl part and said second bowl part is prevented;

wherein said pair of locking rings are operatively associated with a manually operable control means (114); and wherein said control means are swivellable about an axis (P-P) which is generally perpendicular to the longitudinal axis of said bowl.

13. A salad spinner (10) including an outer bowl, a perforated inner basket, a cover and a driving mechanism, wherein the outer bowl and the perforated inner basket are provided as the bowl and basket assembly of claim 12.

14. A salad spinner (10) including an outer bowl, a perforated inner basket, a cover and a driving mechanism, wherein the outer bowl and the perforated inner basket are provided as the bowl and basket assembly of claim 13.

15. A salad spinner according to claim 14 wherein said driving means are releasably engageable with said basket.

16. A bowl and basket assembly kit according to claim 12 wherein said locking means are in contact with said first bowl part and said second bowl part.

\* \* \* \* \*